(12) United States Patent
Liu et al.

(10) Patent No.: US 12,314,314 B2
(45) Date of Patent: May 27, 2025

(54) IMAGE DATA PROCESSING METHOD AND APPARATUS, ELECTRONIC DEVICE, AND STORAGE MEDIUM

(71) Applicant: TENCENT TECHNOLOGY (SHENZHEN) COMPANY LIMITED, Guangdong (CN)

(72) Inventors: Li Qiang Liu, Shenzhen (CN); Xuan Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 965 days.

(21) Appl. No.: 17/395,920

(22) Filed: Aug. 6, 2021

(65) Prior Publication Data

US 2021/0365749 A1 Nov. 25, 2021

Related U.S. Application Data

(63) Continuation of application No. PCT/CN2020/099706, filed on Jul. 1, 2020.

(30) Foreign Application Priority Data

Jul. 22, 2019 (CN) .......................... 201910663368.9

(51) Int. Cl.
*G06F 16/583* (2019.01)
*G06F 16/58* (2019.01)
(Continued)

(52) U.S. Cl.
CPC ...... *G06F 16/5854* (2019.01); *G06F 16/5866* (2019.01); *G06F 18/2431* (2023.01);
(Continued)

(58) Field of Classification Search
CPC .. G06V 40/174; G06V 40/168; G06V 40/176; G06V 10/762; G06F 16/5854;
(Continued)

(56) References Cited

U.S. PATENT DOCUMENTS

2008/0131005 A1\* 6/2008 Oliver ................... H04L 51/212
382/229
2009/0125806 A1\* 5/2009 Chiu ....................... G06F 40/30
717/173
(Continued)

FOREIGN PATENT DOCUMENTS

CN 104394057 A 3/2015
CN 106933960 A 7/2017
(Continued)

OTHER PUBLICATIONS

International Search Report for PCT/CN2020/099706 dated Oct. 15, 2020 (PCT/ISA/210).
(Continued)

*Primary Examiner* — Margaret G Webb
(74) *Attorney, Agent, or Firm* — Sughrue Mion, PLLC

(57) ABSTRACT

Embodiments of the disclosure provide an image data processing method and apparatus, an electronic device, and a storage medium. The method includes: obtaining, in response to an expression image trigger operation of a target user, an operation object associated with the expression image trigger operation on a session page of an instant messaging application; based on the operation object being image data, extracting a target object feature in the image data, and obtaining a first image set associated with the target object feature from an object feature library; and determining a target expression image in response to a
(Continued)

Obtain, in response to an expression image trigger operation of a target user, an operation object associated with the expression image trigger operation on a session page of an instant messaging application — S101

Extract, in a case that the operation object is image data, a target object feature in the image data, and obtain a first image set associated with the target object feature from an object feature library — S102

Determine a target expression image in response to a selection trigger operation performed by the target user in the first image set, and display the target expression image on the session page — S103 selection trigger operation of the target user in the first image set, and displaying the target expression image on the session page.

21 Claims, 19 Drawing Sheets

(51) Int. Cl.
    *G06F 18/2431*     (2023.01)
    *G06F 18/25*     (2023.01)
    *G06V 10/762*     (2022.01)
    *G06V 40/16*     (2022.01)

(52) U.S. Cl.
    CPC .......... *G06F 18/251* (2023.01); *G06F 18/254* (2023.01); *G06V 10/762* (2022.01); *G06V 40/168* (2022.01); *G06V 40/174* (2022.01); *G06V 40/176* (2022.01)

(58) Field of Classification Search
    CPC ............... G06F 16/5866; G06F 18/254; G06F 18/2431; G06F 18/251
    See application file for complete search history.

(56) References Cited

U.S. PATENT DOCUMENTS

| | | | |
|---|---|---|---|
| 2010/0067798 A1 | 3/2010 | Hung et al. | |
| 2012/0047447 A1* | 2/2012 | Haq | G06F 3/04847 715/752 |
| 2016/0055370 A1* | 2/2016 | Garcia | G06V 40/174 382/118 |
| 2016/0259526 A1* | 9/2016 | Lee | H04L 51/04 |
| 2018/0210874 A1* | 7/2018 | Fuxman | G06N 3/045 |
| 2018/0329960 A1* | 11/2018 | Liu | G06Q 10/107 |
| 2019/0288973 A1* | 9/2019 | Liu | G06V 40/176 |
| 2021/0295020 A1* | 9/2021 | Cao | G06V 10/764 |

FOREIGN PATENT DOCUMENTS

| | | |
|---|---|---|
| CN | 107229707 A | 10/2017 |
| CN | 108388557 A | 8/2018 |
| CN | 110414404 A | 11/2019 |

OTHER PUBLICATIONS

Written Opinion of the International Searching Authority for PCT/CN2020/099706 dated Oct. 15, 2020 (PCT/ISA/237).

\* cited by examiner

IMAGE DATA PROCESSING METHOD AND APPARATUS, ELECTRONIC DEVICE, AND STORAGE MEDIUM

CROSS-REFERENCE TO RELATED APPLICATION(S)

This application is a continuation application of International Application No. PCT/CN2020/099706, filed Jul. 1, 2020, which claims the priority to Chinese Patent Application No. 201910663368.9, filed with the China National Intellectual Property Administration on Jul. 22, 2019, the disclosures of which are incorporated by reference in their entireties.

FIELD

The disclosure relates to the field of Internet technologies, and in particular, to an image data processing method and apparatus, an electronic device, and a storage medium.

BACKGROUND

With the continuous development of image technologies and the emergence of various social entertainment software, an increased number of users chat by using instant messaging applications. Expression images, as a way to express user emotions, have been widely used in chatting by using instant messaging applications.

In the related art, a user may search all of the user's favorited expression images to find an expression image that can express an emotion of the user, and send the selected expression image to another user to interact with the another user. However, when a relatively large quantity of expression images are favorited by the user, the way existing systems and software save and display these images are inefficient. Some of the saved and/or displayed images may not always meet a current chat situation and the user needs to spend a lot of time searching for the appropriate one.

SUMMARY

Embodiments of the disclosure provide an image data processing method and apparatus, an electronic device, and a storage medium, to improve image data processing efficiency.

The embodiments of the disclosure provide an image data processing method, performed by an electronic device, the method including:

obtaining, in response to an expression image trigger operation of a target user, an operation object associated with the expression image trigger operation on a session page of an instant messaging application;

based on the operation object being image data, extracting a target object feature in the image data, and obtaining a first image set associated with the target object feature from an object feature library; and displaying at least one expression image included in the first image set, and determining a target expression image in response to a selection trigger operation of the target user among the first image set, and displaying the target expression image on the session page.

The embodiments of the disclosure provide an image data processing apparatus, including at least one memory configured to store program code; and at least one processor configured to read the program code and operate as instructed by the program code, the program code including:

obtaining code configured to cause the at least one processor to obtain, in response to an expression image trigger operation of a target user, an operation object associated with the expression image trigger operation on a session page of an instant messaging application;

extraction code configured to cause the at least one processor to extract, based on the operation object being image data, a target object feature in the image data, and obtain a first image set associated with the target object feature from an object feature library; and selection code configured to cause the at least one processor to determine a target expression image in response to a selection trigger operation of the target user among the first image set, and display the target expression image on the session page.

The embodiments of the disclosure provide an electronic device, including a processor and a memory, the processor being connected to the memory, the memory being configured to store a computer program, and the processor being configured to invoke the computer program, to perform the method according to the embodiments of the disclosure.

The embodiments of the disclosure further provide a non-transitory computer-readable storage medium, the computer-readable storage medium storing a computer program, the computer program including program instructions, the program instructions being executable by at least one processor to perform the method according to the embodiments of the disclosure.

BRIEF DESCRIPTION OF THE DRAWINGS

To describe the technical solutions in example embodiments of the disclosure more clearly, the accompanying drawings for describing the example embodiments are briefly described hereinafter. The accompanying drawings in the following descriptions show merely some embodiments of the disclosure, and a person of ordinary skill in the art may obtain other accompanying drawings according to these accompanying drawings without creative efforts.

DETAILED DESCRIPTION

The technical solutions in the example embodiments of the disclosure are clearly and completely described in the following with reference to the accompanying drawings in the embodiments of the disclosure. The described embodiments are merely some rather than all of the embodiments of the disclosure. All other embodiments obtained by a person of ordinary skill in the art based on the embodiments of the disclosure without making creative efforts shall fall within the protection scope of the disclosure.

Figure 1:
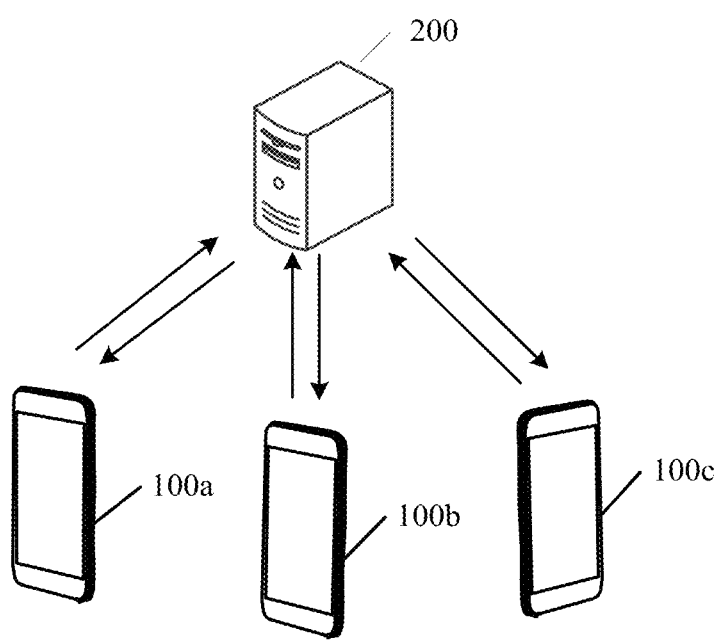
FIG. 1 is a diagram of a network architecture according to an embodiment of the disclosure.

FIG. 1 is a diagram of a network architecture according to an embodiment of the disclosure. The network architecture may include a server 200 and a plurality of terminal devices (as shown in FIG. 1, may include a terminal device 100a, a terminal device 100b, and a terminal device 100c). The server 200 may perform data transmission with each of the terminal devices by using a network. Each terminal device may have an instant messaging application (for example, QQ or WeChat) installed. The server 200 may be a backend server corresponding to the instant messaging application. Therefore, each terminal device may perform data transmission with the server 200 by using a client corresponding to the instant messaging application. For example, each terminal device may implement instant chatting with another terminal device by using the server 200, or each terminal device may transmit data to the server 200, so that the server 200 processes the transmitted data and then returns the data to the terminal device.

Using the terminal device 100a as an example, on a session page of an instant messaging application, the terminal device 100a may obtain, in response to an expression image trigger operation of a user, image data (if an operation object operated by the user is image data) associated with the expression image trigger operation, extract a target object feature in the image data, obtain an image set associated with the target object feature from a pre-determined object feature library, and select, from the image set based on a selection operation performed by the user for the image set on the session page, a target expression image to be displayed on the session page. The object feature library may be obtained in a manner in which the terminal device 100a collects all expression images sent or received by the user in historical chatting information and sends the expression images to the server 200, and the server 200 performs feature extraction and classification on the received expression images. After classifying the expression images, the server 200 may return an obtained object feature library of the user to the terminal device 100a, so that the terminal device 100a may obtain an image set associated with a target object from the object feature library.

In an embodiment, if the terminal device 100a integrates image feature extraction and classification functions, the object feature library corresponding to the user may be directly obtained by using the terminal device 100a, and the target expression image is obtained from the object feature library in response to the expression image trigger operation. Descriptions are made below in detail by using an example of how the terminal device 100a determines a target expression image. The terminal device 100a, the terminal device 100b, the terminal device 100c, and the like may include, for example but not limited to, a mobile phone, a tablet computer, a notebook computer, a palmtop computer, a mobile Internet device (MID), a wearable device (for example, a smart watch or a smart band), and the like.

Figure 2A:
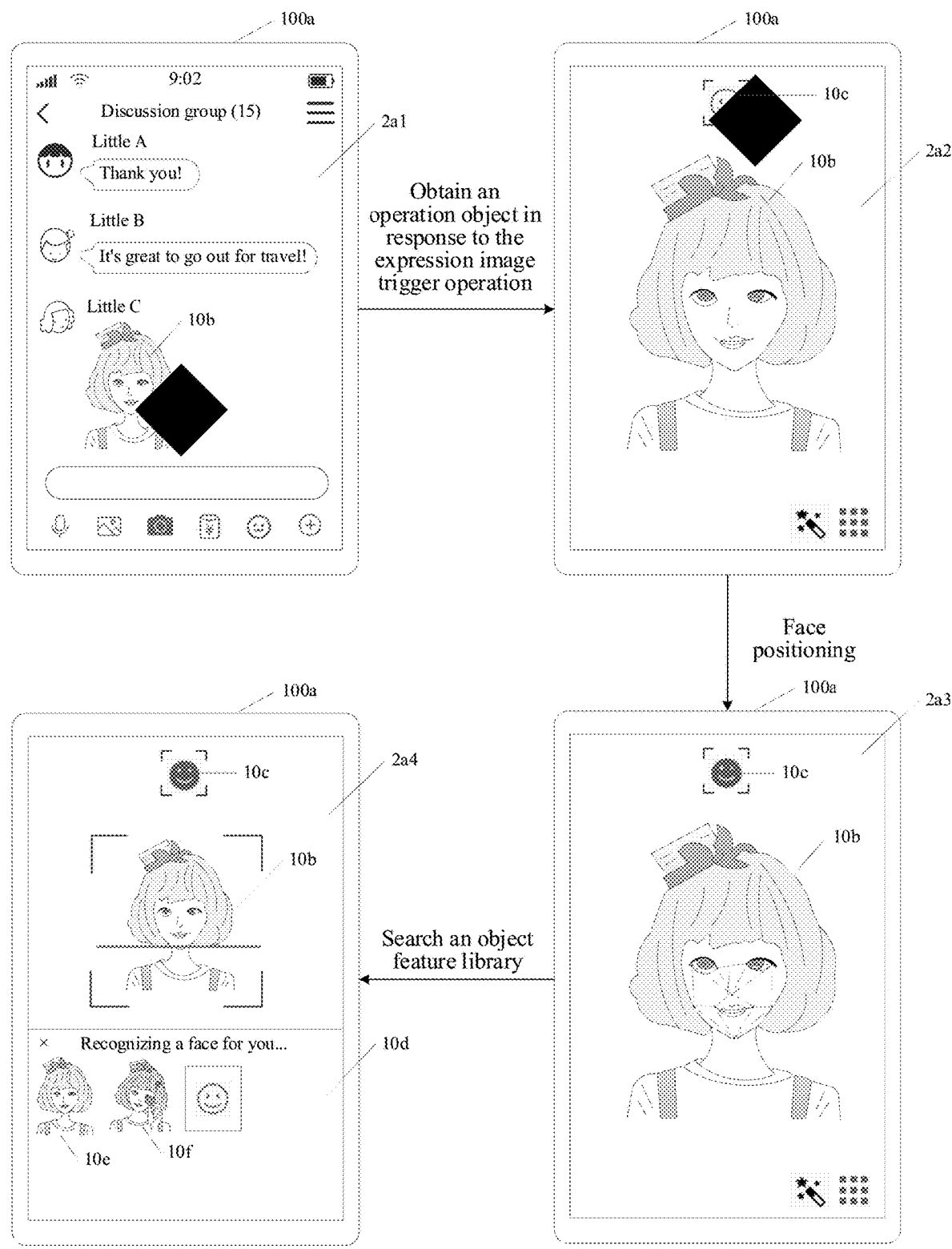
FIG. 2a and FIG. 2b are schematic diagrams of scenarios of an image data processing method according to an embodiment of the disclosure.
Figure 2B:
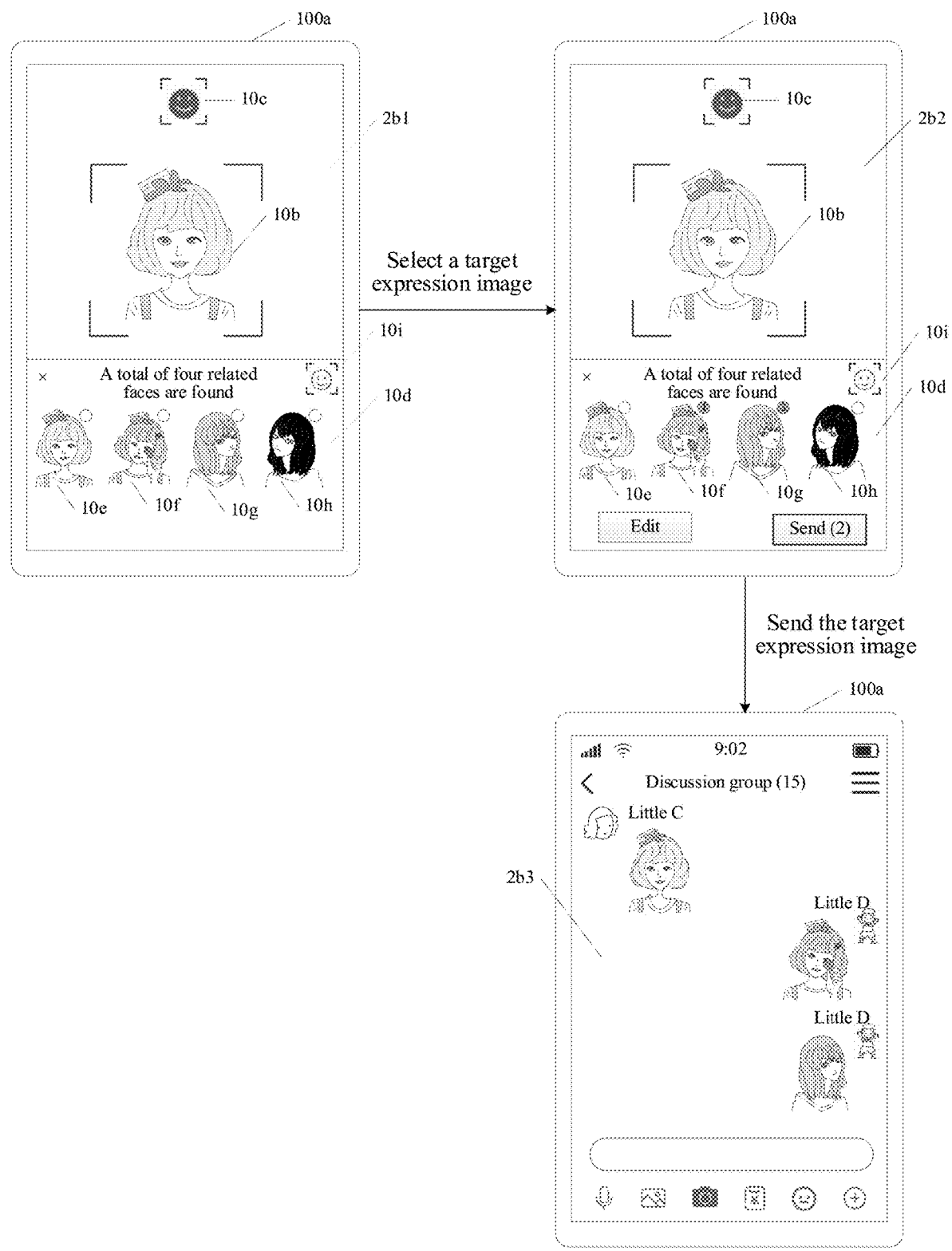

FIG. 2a and FIG. 2b are schematic diagrams of scenarios of an instant messaging-based image data processing method according to an embodiment of the disclosure. As shown in FIG. 2a, a user may open an instant messaging application (for example, QQ or WeChat) on the terminal device 100a, and click/tap a session page 2a1 corresponding to any contact or group (which may be understood as a platform on which people (e.g., with the same hobbies or attributes) get together to chat and communicate with each other) in the instant messaging application. The user may click/tap image data 10b sent by a friend or another user in the group on the session page 2a1, to quickly obtain a desirable expression image. After the user performs a expression image trigger operation (e.g., clicks/taps) on the image data 10b, the terminal device 100a may obtain an operation object (that is, the image data 10b) in response to the expression image trigger operation performed by the user on the session page 2a1, and display a display page 2a2 of the image data 10b. The image data 10b may be displayed on the display page 2a2. The display page 2a2 may further provide a face search entry 10c for the user, so that the user may quickly search for all expression images saved by the user based on the face search entry 10c.

After the user clicks/taps the face search entry 10c, the terminal device 100a may perform face positioning on the image data 10b to extract facial features from the image data 10b, for example, position facial parts such as eyebrows, eyes, mouth, and nose in a face image in the image data 10b on a display page 2a3, perform recognition in the face image included in the image data 10b, and search an object feature library for an expression image matching the facial features, that is, search the object feature library for an expression image similar to the image data 10b, for example, an image 10e or an image 10f. The expression image found from the object feature library may be displayed in a region 10d on a display page 2a4.

As shown in FIG. 2b, after the object feature library is searched, an image set associated with the image data 10b, that is, all expression images that are found in the object feature library and associated with the image data 10b, may be obtained. For example, the image set may include an image 10e, an image 10f, an image 10g, and an image 10h. The user may select at least one image (for example, the image 10f and the image 10g) from the image set. As shown in a display page 2b2, after detecting a selection trigger operation of the user, the terminal device 100a may display an "Edit" button and a "Send" button in the region 10d, and display, on the "Send" button, a quantity of expression images that are selected by the user. The user may select the "Edit" button to edit the selected expression image (for example, add a text or make a dynamic expression on the expression image), or may select the "Send" button to send the selected expression image to the session page 2b3 as a target expression image, so that the contact or the another user in the group may view the target expression image sent by the user.

Figure 3:
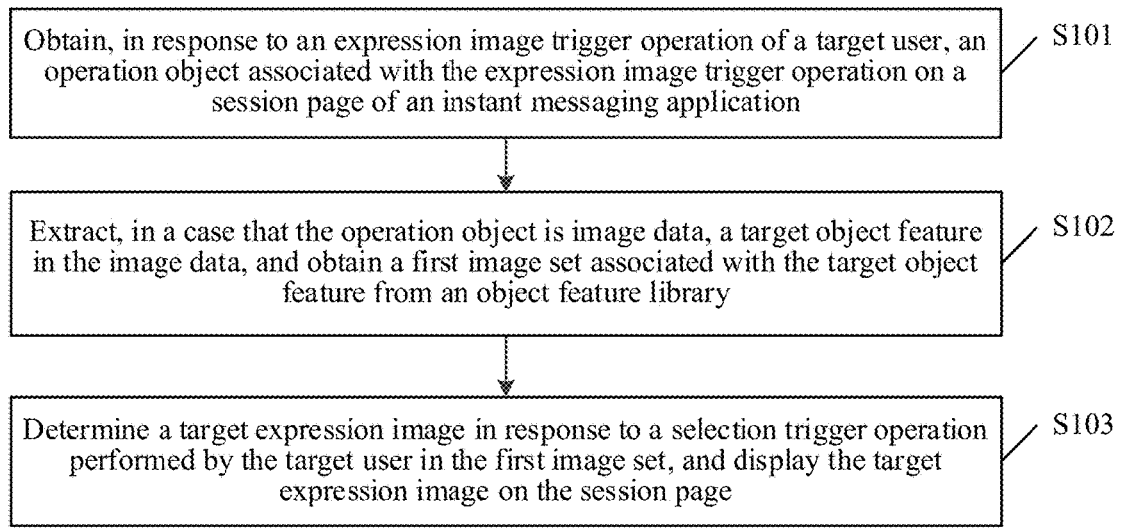
FIG. 3 is a schematic flowchart of an image data processing method according to an embodiment of the disclosure.

FIG. 3 is a schematic flowchart of an image data processing method according to an embodiment of the disclosure. The method is performed by an electronic device, for example, any of the terminal devices 100a, 100b, 100c shown in FIG. 1. An object feature library may be obtained by the terminal device in advance or obtained by the terminal device from a server. As shown in FIG. 3, the method may include the following operations S101-S103:

Operation S101: Obtain, in response to an expression image trigger operation of a target user, an operation object associated with the expression image trigger operation on a session page of an instant messaging application.

For example, the terminal device (corresponding to the terminal device 100a in the embodiment corresponding to FIG. 2a) obtains the operation object associated with the expression image trigger operation in response to the expression image trigger operation on the session page (corresponding to the session page 2a1 in the embodiment corresponding to FIG. 2a) of the instant messaging application. The operation object may be image data (corresponding to the image data 10b in the embodiment corresponding to FIG. 2a) sent by a user in a group on the session page, a classification label corresponding to an associated user of a target user (that is, the user corresponding to the terminal device), symbol information about an expression, a keyword corresponding to the associated user of the target user, or the like. Certainly, if the session page is a session page between the target user and an associated user, the image data may be an expression image sent by the associated user or the target user.

Operation S102: Extract, when the operation object is image data, a target object feature in the image data, and obtain a first image set associated with the target object feature from the object feature library.

For example, the object feature library includes a plurality of object features and expression images corresponding to the object features. Expression images corresponding to similar object features are clustered into an associated image cluster. If the operation object is image data, the terminal device may position a target object included in the image data, extract a target object feature corresponding to the target object in the image data; determine similarities between the target object feature and the plurality of object features included in the object feature library, and determine an associated image cluster to which an object feature with the largest similarity belongs as a target image cluster corresponding to the target object feature; and determine an expression image in the target image cluster as the first image set associated with the target object feature, the first image set including at least one expression image.

If the image data is a human face image, the target object may be a human face in the image data. For example, if the image data is a face image of a user Little A, the target object is a face of Little A, the target object feature is facial features of Little A (for example, facial part features of Little A), the object feature library may include a plurality of facial features, and face images respectively corresponding to the plurality of facial features. Certainly, the image data may alternatively be other image data, for example, a dog face image or a cat face image. When the image data is a dog face image, the object feature library may include facial features of a plurality of types of dogs and face images respectively corresponding to the plurality of types of dogs. When the image data is a cat face image, the object feature library may include facial features of a plurality of types of cats and face images respectively corresponding to the plurality of types of cats.

A process of obtaining the object feature library is described below in detail by using a face image as an example.

The terminal device obtains historical message images of the target user. For example, the terminal device may collect historical received images and historical sent images of the target user in the instant messaging application. The historical received images and the historical sent images are collectively referred to as historical message images. The terminal device performs face detection on the historical message images, selects images including a face from the historical message images, determines the historical message images including a face as expression images, extracts facial features corresponding to expression images, and clusters the facial features. For example, expression images of the same person are clustered into one cluster to obtain an object feature library corresponding to the target user. The object feature library includes expression images respectively corresponding to a plurality of facial features and may also be referred to as a facial feature library. In addition, the expression images may be added to an expression image library corresponding to the target user.

Figure 4:
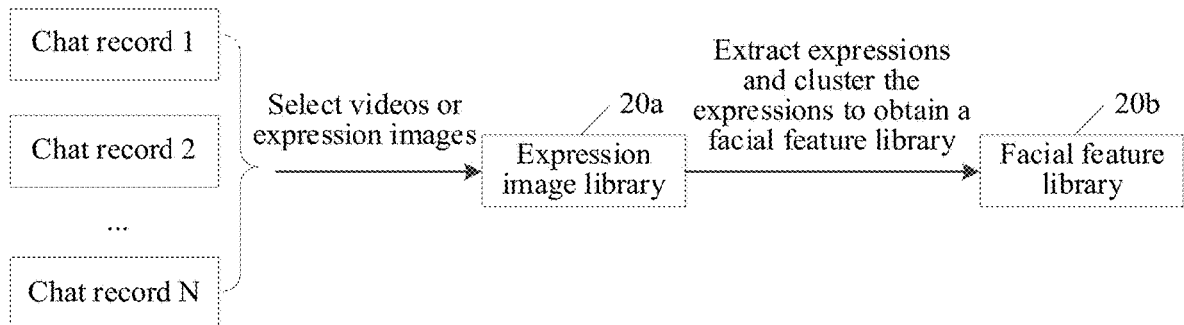
FIG. 4 is a schematic diagram of determining an object feature library according to an embodiment of the disclosure.

FIG. 4 is a schematic diagram of determining an object feature library according to an embodiment of the disclosure. As shown in FIG. 4, in the instant messaging application, the terminal device may obtain all chat records of the target user, for example, a chat record 1, a chat record 2, . . . , and a chat record N, screen videos or expression images in the chat records, that is, select videos or expression images including a face image from all the chat records, form an expression image library 20a corresponding to the target user by using the selected videos or expression images, extract facial features included in the videos or expression images in the expression image library 20a, and cluster the facial features. The facial features are clustered by using a clustering algorithm (for example, a k-means clustering algorithm) to cluster similar facial features into the same cluster. That is, videos or expression images corresponding to similar facial features are clustered into the same cluster, which may also be referred to as an associated image cluster. Finally, all the videos or expression images in the expression image library 20a may be classified into a plurality of associated image clusters. The plurality of associated image clusters may form a facial feature library 20b.

Each user corresponds to a facial feature library. Facial feature libraries corresponding to different users may or may not share an associated image cluster. For example, if a user A and a user B have a common friend, a facial feature library corresponding to the user A and a facial feature library corresponding to the user B may share an associated image cluster. The facial feature library may be formed in advance through clustering by the terminal device. During application, the terminal device may directly search the facial feature library 20b for an expression image. In an embodiment, the facial feature library corresponding to the target user may be timely updated by using chat records collected by the terminal device.

In a process of clustering the facial features, a user avatar (hereinafter referred to as an associated user avatar) of an associated user of the target user, e.g., an avatar of a friend of the target user, may be obtained, and the associated user avatar is used as auxiliary information for the clustering, that is, it is detected whether the associated user avatar includes a face image. If a face image is included, an avatar feature is extracted from the associated user avatar, and similarities between the avatar feature and the facial features are calculated to determine an expression image associated with the avatar feature of the associated user. The expression image is clustered into an associated image cluster. The object feature library is formed by using associated image clusters respectively matching associated users. Each of the associated image clusters includes at least one expression image corresponding to an associated user avatar. For example, an expression image corresponding to a facial feature with a similarity greater than a set threshold may be determined as an expression image associated with the associated user avatar. In addition, the cluster may be named a user nickname corresponding to the associated user avatar, or may be named a cluster label corresponding to the cluster.

If a face image is not detected in the associated user avatar (for example, the avatar is a scenery picture), similarities between the facial features corresponding to the expression images are directly calculated. Expression images with higher similarities are clustered into the same cluster. Because the terminal device cannot match the cluster with an associated user avatar, the terminal device cannot name the cluster (that is, set a cluster label) and may simply name the cluster in a default sorting manner. In this case, the target user may view an expression image included in the cluster and enter a user nickname matching the expression image in the cluster. The object feature library may include a plurality of associated image clusters obtained through clustering by the terminal device. Each of the associated image clusters includes at least one expression image corresponding to an associated user avatar.

For example, in the instant messaging application, the target user has a total of three friends (that is, three associated users), namely, Little A, Little B, and Little C. After obtaining the expression image library corresponding to the target user, the terminal device may extract facial features corresponding to all the expression images in the expression image library. The terminal device detects, through face detection on avatars of the three friends, that the avatars corresponding to Little A and Little B include a face image, and the avatar corresponding to Little C does not include a face image. In this case, the terminal device may extract an avatar feature 1 from the avatar corresponding to Little A, calculate similarities between the avatar feature 1 and the facial features, determine an expression image to which a facial feature with a similarity greater than a threshold (for example, 0.6) belongs as an associated image cluster 1 associated with Little A, and set "Little A" as a cluster label of the associated image cluster 1. The terminal device extracts an avatar feature 2 from the avatar corresponding to Little B, calculate similarities between the avatar feature 2 and the facial features, determine an expression image to which a facial feature with a similarity greater than the threshold belongs as an associated image cluster 2 associated with Little B, and set "Little B" as a cluster label of the associated image cluster 2. The terminal device obtains an associated image cluster 3 by calculating similarities between the facial features. Because the terminal device cannot match the associated image cluster 3 with a friend of the target user, a cluster label corresponding to the associated user 3 is blank or is set to 1 by default. After viewing an expression image included in the associated image cluster 3, if the target user finds that the expression image in the associated image cluster 3 is a face image corresponding to Little C, the target user may manually set "Little C" as a cluster label of the associated image cluster 3.

Figure 5A:
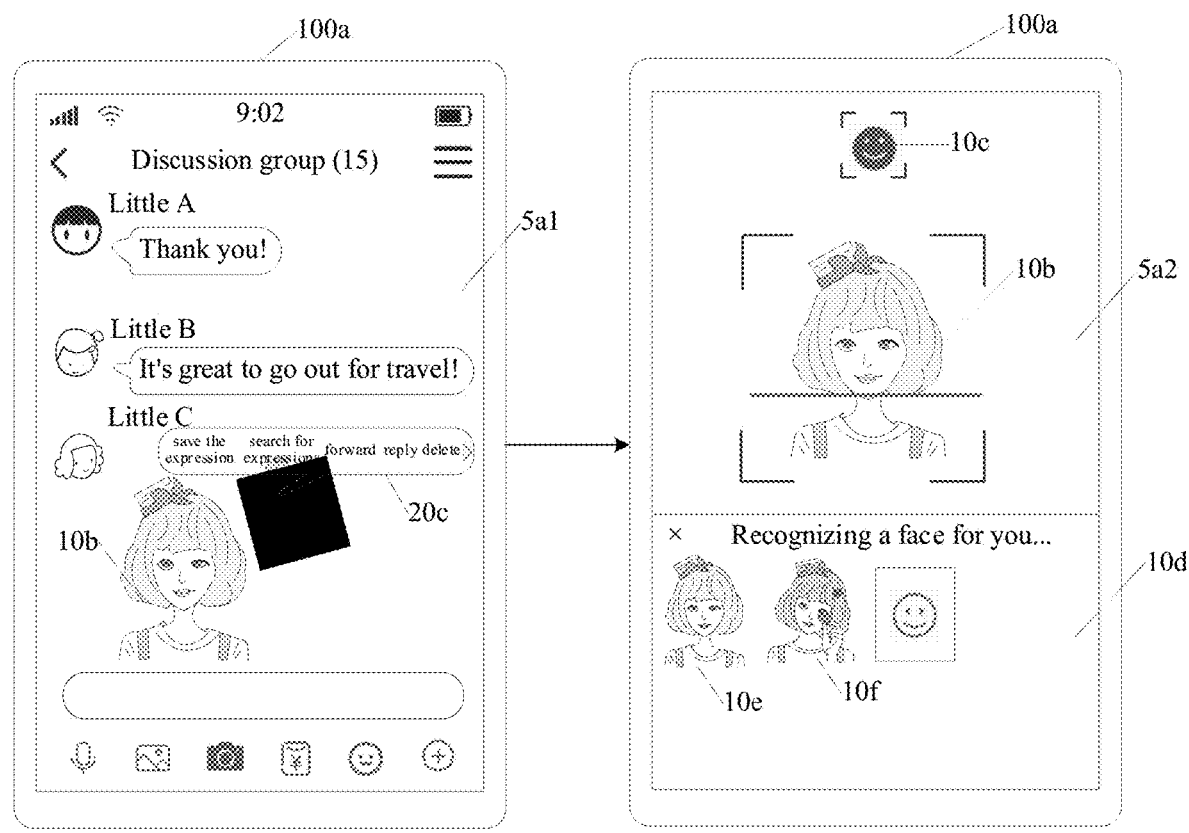
FIG. 5a and FIG. 5b are schematic diagrams of an instant messaging-based expression search page according to an embodiment of the disclosure.
Figure 5B:
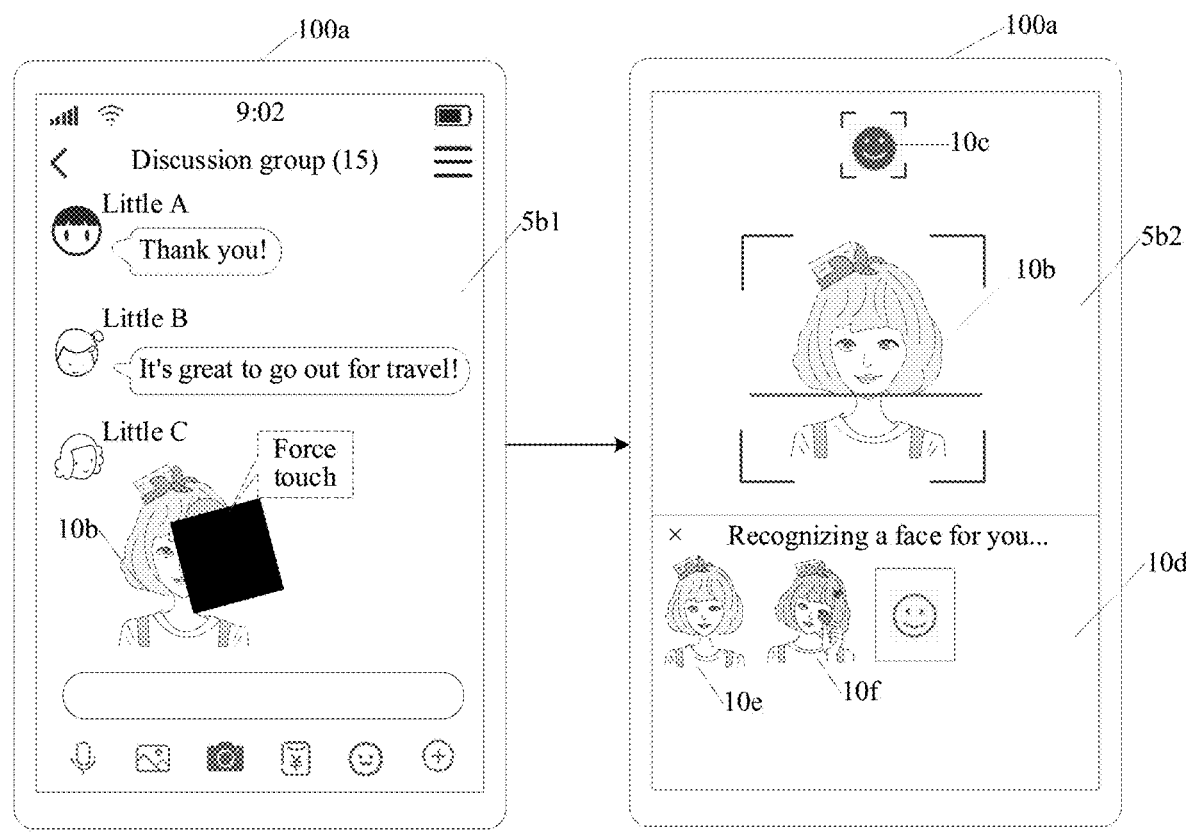

In an embodiment, the terminal device may further provide a quick operation entry of the expression image trigger operation for the target user. FIG. 5a and FIG. 5b are schematic diagrams of an instant messaging-based expression search page according to an embodiment of the disclosure.

As shown in FIG. 5a, on a session page Sal, the target user may touch and hold an image data 10b to quickly search the object feature library for an expression image similar to the image data 10b. When the target user touches and holds the image data 10b, the terminal device 100a may display a menu bar 20c for the image data 10b on the session page Sal in response to the touching and holding operation of the target user. The menu bar 20c may include function options such as save the expression, search for expressions, forward, reply, and delete. When the target user clicks/taps the function option of "search for expressions" in the menu bar 20c, the terminal device 100a may directly jump from the session page 5a1 to an expression image search page 5a2 in response to the quick expression image trigger operation of the target user, so as to search the object feature library for an image set associated with the image data 10b. The touching and holding may be understood as a state in which the target user touches the image data 10b and the terminal device 100a detects that a touching time exceeds a set time threshold.

In an embodiment, as shown in FIG. 5b, the target user may alternatively force touch an image data 10b on a session page 5b1 to quickly search the object feature library for an expression image similar to the image data 10b. When the target user force touches the image data 10b, the terminal device may directly jump from the session page 5b1 to an expression image search page 5b2 in response to the quick expression image trigger operation of the target user, so as to search the object feature library for an image set associated with the image data 10b. The force touching may be understood as a state in which the target user touches the image data 10b on the session page 5b1 and a pressure sensor in the terminal device 100a detects that a pressure value sensed by a terminal screen is greater than a preset threshold.

Operation S103: Determine a target expression image in response to a selection trigger operation performed by the target user in the first image set, and display the target expression image on the session page.

For example, after obtaining the image set matching the target object feature from the object feature library, all expression images in the image set may be displayed on a terminal page of the terminal device. The target user may select an expression image from the image set. After the target user selects the expression image from the image set, the terminal device determines, in response to the selection trigger operation for the image set, the expression image selected by the target user as a target expression image to be displayed on the session page. The target user may select one or more target expression images from the image set. When the target user selects a plurality of target expression images, the terminal device may obtain the plurality of target expression images selected by the target user, and send each of the selected target expression images as a message to the session page. Alternatively, the terminal device may further edit the selected target expression image and send the edited target expression image to the session page.

In this embodiment of the disclosure, in the instant messaging application, the user may operate the image data displayed on the session page, and the terminal device may obtain the image set associated with the image data by extracting the target object feature of the image data, so that the target expression image that the user wants to display may be quickly selected from the image set, thereby improving the image data processing efficiency.

Figure 6:
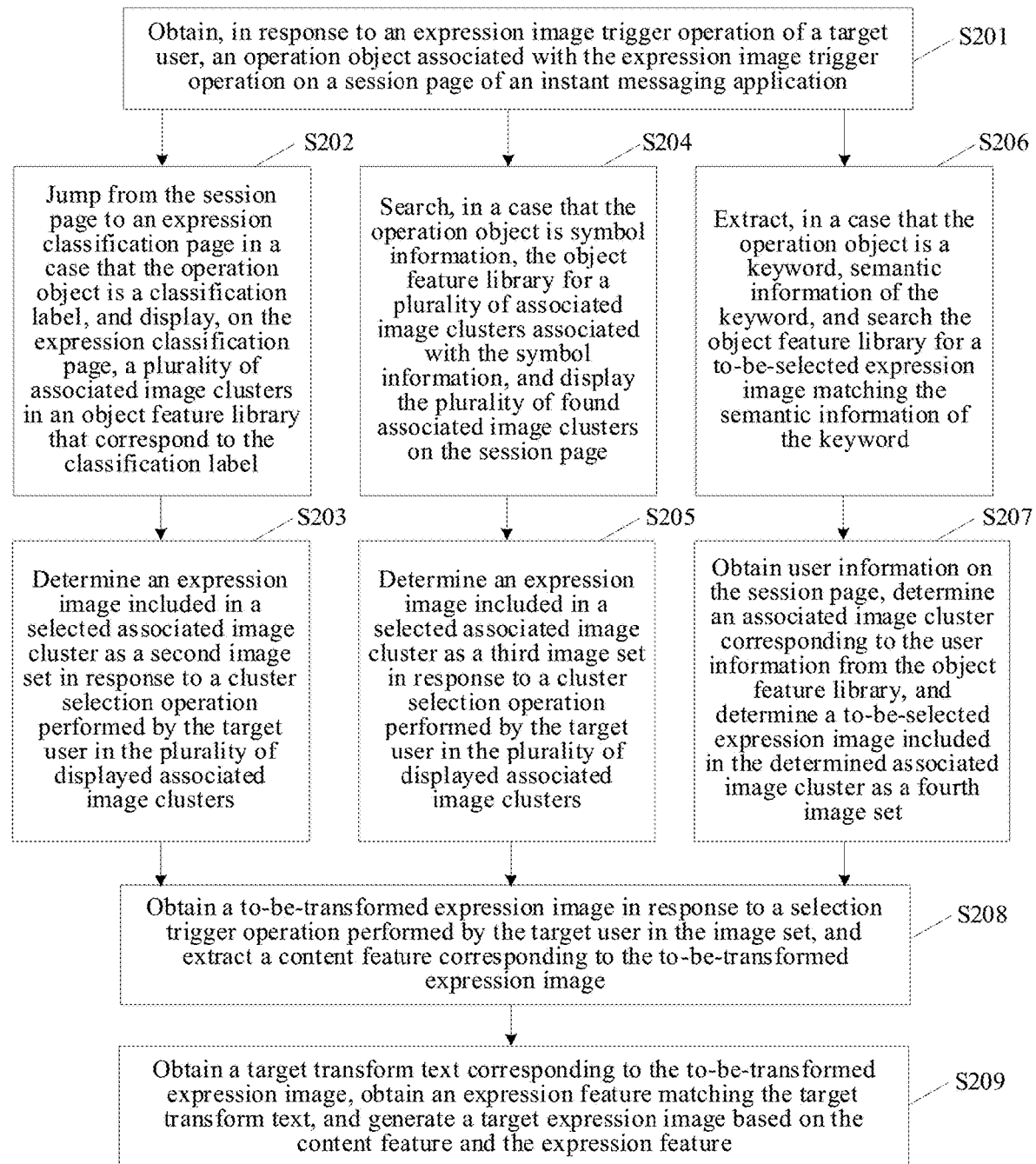
FIG. 6 is a schematic flowchart of another image data processing method according to an embodiment of the disclosure.

FIG. 6 is a schematic flowchart of another image data processing method according to an embodiment of the disclosure. The method is performed by an electronic device, for example, any one of the terminal device 100a, 100b, 100c shown in FIG. 1. An object feature library may be obtained by the terminal device in advance or obtained by the terminal device from a server. As shown in FIG. 6, the method may include the following operations S201-S209:

Operation S201: Obtain, in response to an expression image trigger operation of a target user, an operation object associated with the expression image trigger operation on a session page of an instant messaging application.

For an example implementation of operation S201, reference may be made to operation S101 in the embodiment corresponding to FIG. 3. Details are not described herein again.

Operation S202: Jump from the session page to an expression classification page based on the operation object being a classification label, and display, on the expression classification page, a plurality of associated image clusters in the object feature library that correspond to the classification label.

The object feature library includes a plurality of associated image clusters, and expression images in each of the associated image clusters have similar object features.

Operation S203: Determine an expression image included in a selected associated image cluster as a second image set in response to a cluster selection operation performed by a target user in the plurality of displayed associated image clusters.

For example, if the operation object is a classification label, the terminal device may obtain a classification label of an expression image of an associated user associated with the target user, jump from the session page to the expression classification page, and display, on the expression classification page, the plurality of associated image clusters in the object feature library. The user may select any associated image cluster from the plurality of displayed associated image clusters, so that the terminal device determines, in response to the cluster trigger operation (that is, a cluster selection operation) performed by the target user on the expression classification page, an expression image included in the associated image cluster selected by the target user as a second image set.

Figure 7A:
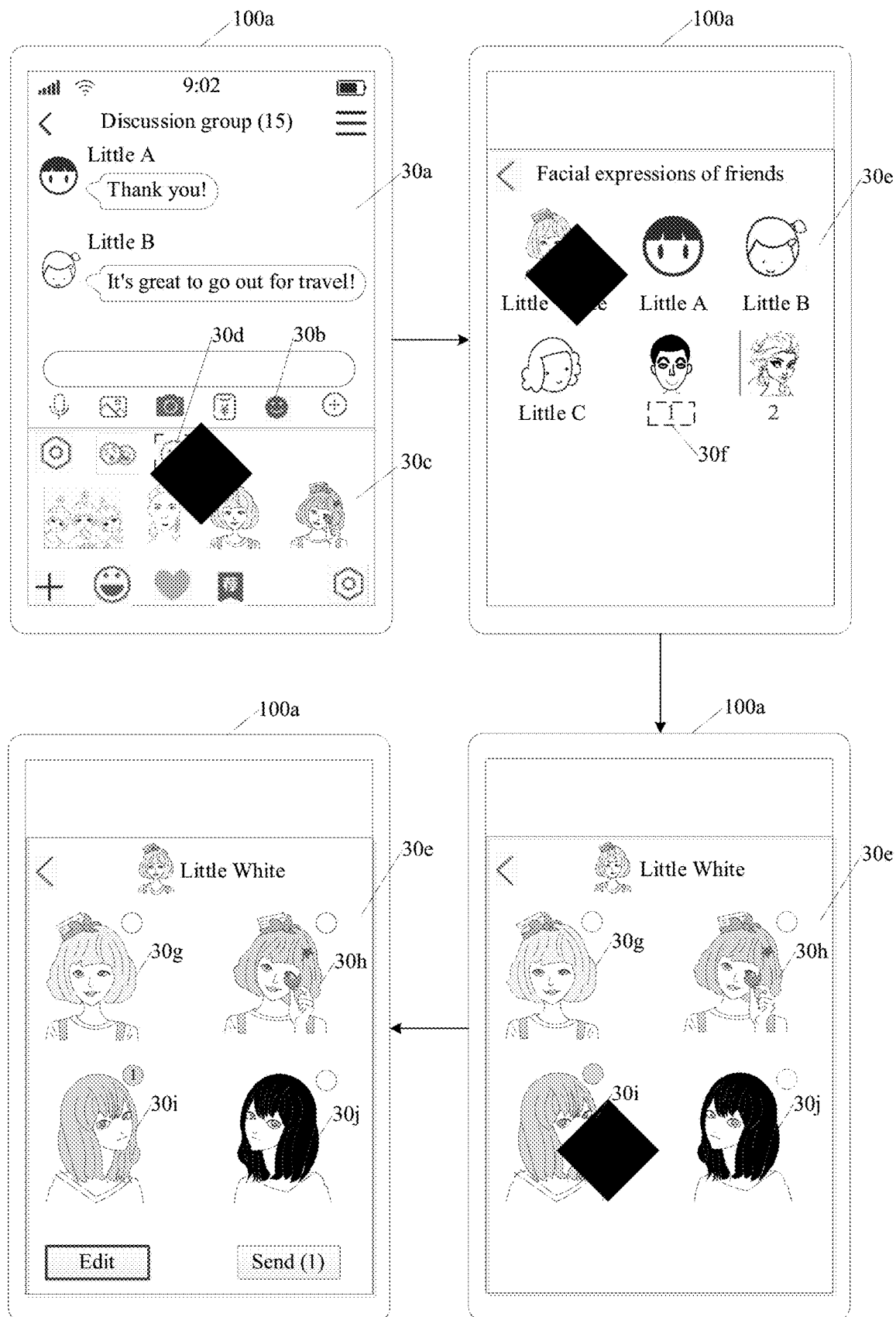
FIG. 7a to FIG. 7d are schematic page diagrams of an instant messaging-based image data processing method according to an embodiment of the disclosure.

FIG. 7a is a schematic page diagram of an instant messaging-based image data processing method according to an embodiment of the disclosure. As shown in FIG. 7a, on a session page 30a of the instant messaging application, the target user may click/tap an expression icon 30b to trigger the terminal device 100a to display an expression panel 30c on the session page 30a. A facial expression entry 30d may be displayed on the expression panel 30c. In an embodiment, the facial expression entry 30d may be displayed based on selection of an expression image favoriting icon (not shown) on the expression panel 30c. After the target user clicks/taps the facial expression entry 30d, the terminal device 100a may jump from the session page 30a to an expression classification page 30e in response to the click/tap operation of the target user, and pulls the object feature library corresponding to the target user. A plurality of associated image clusters in the object feature library corresponding to the target user may be displayed on the expression classification page 30e. The plurality of associated image clusters may include associated image clusters in which avatars of friends of the target user are face images and expression images expression images are included in association with respective friends of the target user (for example, associated image clusters respectively corresponding to an associated user "Little White", an associated user "Little A", an associated user "Little B", and an associated user "Little C"), and associated image clusters that include expression images but cannot be matched with friends (for example, associated image clusters corresponding to a number "1" and a number "2", where the number "1" and the number "2" may be default cluster labels when the terminal device 100a obtains the associated image clusters). The target user may reset the cluster label for the associated image cluster corresponding to the number "1" in a region 30f, so that the cluster label matches an expression image in the associated image cluster. For example, if the associated image cluster corresponding to the number "1" is an expression image of a friend "Little D", the number "1" may be replaced with "Little D". Similarly, the target user may reset the cluster label for the associated image cluster corresponding to the number "2".

For the plurality of associated image clusters displayed on the expression classification page 30e, the target user may select any associated image cluster (for example, the associated image cluster corresponding to "Little White") from the plurality of associated image clusters. Further, in response to the cluster trigger operation (that is, a cluster selection operation) performed by the target user on the expression classification page 30e, the terminal device 100a may determine an expression image included in the associated image cluster selected by the target user as an image set, and display each expression image in the image set on the expression classification page 30e. For example, after the target user selects the associated image cluster corresponding to "Little White", the terminal device may display all expression images, namely, an image 30g, an image 30h, an image 30i, and an image 30j, in the associated image cluster corresponding to "Little White" on the expression classification page 30e. Further, the target user may select a desirable expression image (for example, the image 30i) from the image set, and trigger the terminal device by using an "Edit" button, to edit the image 30i, or trigger the terminal device 100a by using a "Send" button, to send the image 30i to the session page 30a.

In an embodiment, in a scenario in which the operation object is image data, if expression image results recognized from the object feature library do not satisfy the target user, the target user may click/tap a facial expression entry on a display page of the expression image results, to trigger the terminal device to jump from the display page of the expression image results to the expression classification page, and display, on the expression classification page, the plurality of associated image clusters in the object feature library. For example, in the embodiment corresponding to FIG. 2a, when the target user clicks/taps a facial expression entry (e.g., a bounding box) in the region 10d, the terminal device 100a may jump to the expression classification page (for example, the expression classification page 30e shown in FIG. 7a) in response to the click/tap operation performed by the target user on the facial expression entry. The plurality of associated image clusters in the object feature library corresponding to the target user may be displayed on the expression classification page, for the target user to select an image set from the plurality of associated image clusters.

Operation S204: Search, when the operation object is symbol information, the object feature library for a plurality of associated image clusters associated with the symbol information, and display the plurality of found associated image clusters on the session page.

Operation S205: Determine an expression image included in a selected associated image cluster as a third image set in response to a cluster selection operation performed by the target user in the plurality of displayed associated image clusters.

Figure 7B:
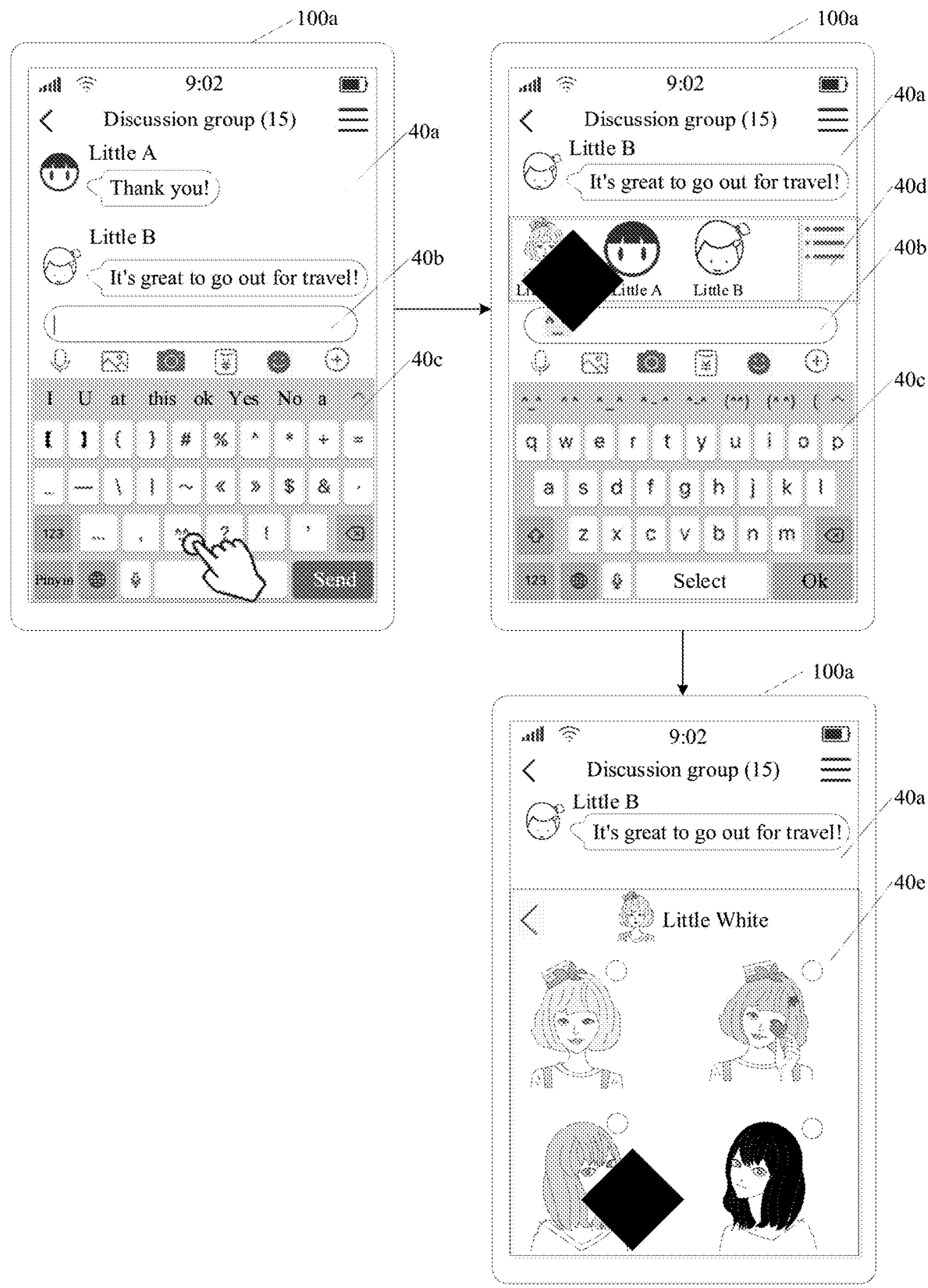

FIG. 7b is a schematic page diagram of an instant messaging-based image data processing method according to an embodiment of the disclosure. As shown in FIG. 7b, on a session page 40a in the instant messaging application, the target user may click/tap an input box 40b to display an input keyboard 40c on the session page 40a. The target user clicks/taps a symbol function key on the input keyboard 40c, to input a specific expression symbol (for example, a "smiley" expression symbol) into the input box 40b, to trigger the terminal device 100a to search the object feature library for a plurality of associated image clusters associated with the symbol information in the input box 40b, and display, in a region 40d on the session page 40a, the plurality of associated image clusters associated with the symbol information. The target user may select an expression image included in an associated image cluster from the plurality of associated image clusters as an image set. For example, the target user may select the associated image cluster corresponding to "Little White", and the terminal device 100a may determine the expression images included in the associated image cluster corresponding to "Little White" as an image set after the target user selects the associated image cluster corresponding to "Little White", and display, on a display page 40e, all the expression images included in the associated image cluster corresponding to "Little White", for the target user to select a desirable expression image from the image set.

The symbol information may be an expression symbol with specific semantic information (for example, a "sad" expression symbol), and an associated image cluster associated with the symbol information may be an associated image cluster including a "sad" expression image. In an embodiment, the symbol information may alternatively be all expression symbols in general. Regardless of whether the input symbol information is a "sad" expression symbol or a "smiley" expression symbol, as long as an expression symbol is inputted into the input box, the terminal device may be triggered to display an associated image cluster on the session page. In this case, an associated image cluster associated with the symbol information may be all associated image clusters included in the object feature library.

Operation S206: Extract, when the operation object is a keyword, semantic information of the keyword, and search the object feature library for a to-be-selected expression image (or candidate expression image) matching the semantic information of the keyword.

The object feature library includes a plurality of associated image clusters. Expression images in each of the associated image clusters have similar object features. Each associated image cluster corresponds to an associated user of the target user in the instant messaging application.

Operation S207: Obtain user information on the session page, determine an associated image cluster corresponding to the user information from the object feature library, and determine a to-be-selected expression image included in the determined associated image cluster as a fourth image set.

Figure 7C:
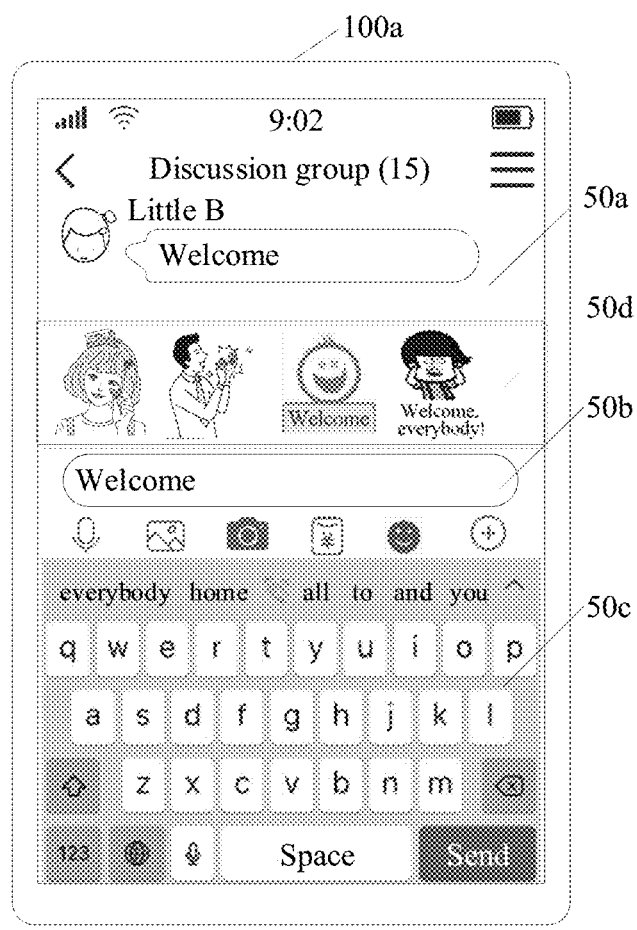
Figure 7D:
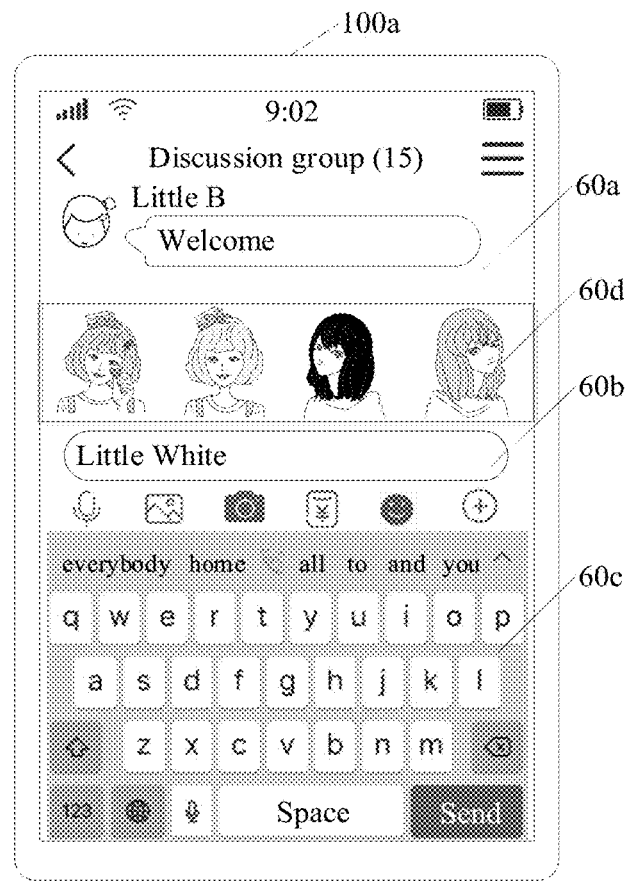

FIGS. 7c and 7d are schematic page diagrams of an instant messaging-based image data processing method according to an embodiment of the disclosure. As shown in FIG. 7c, on a session page 50a of the instant messaging application, the target user may click/tap an input box 50b to display an input keyboard 50c on the session page 50a. The target user enters a keyword (for example, "Welcome") into the input box 50b by using the input keyboard 50c. In this case, the terminal device 100a may obtain semantic information of the keyword "Welcome", and search the object feature library for to-be-selected expression images matching the keyword "Welcome".

The terminal device 100a may obtain user information of a group on the session page 50a, determine whether the expression image belongs to an associated image cluster corresponding to the user information of the group, and determine a expression image that belongs to the associated image cluster corresponding to the user information of the group as an image set to be provided to the user for selection. For example, the group on the session page 50a includes a user "Little A", a user "Little B", and a user "Little C", and the expression images found from the object feature library include an expression image of a user "Little D". In this case, the expression image of the user "Little D" is deleted from candidate expression images, and candidate expression images corresponding to the user "Little A", the user "Little B", and the user "Little C" are determined as expression images to be included in an image set to be provided to the user for selection. In an embodiment, the image set may further include a popular expression image matching the keyword on the Internet, and expression images in the image set are displayed in a region 50d on the session page 50a.

As shown in FIG. 7d, the keyword may alternatively be a name (which may also be referred to as a friend nickname) of an associated user of the target user. The target user enters the name of the associated user of the target user, for example, "Little White", into an input box 60b on a session page 60a by using an input keyboard 60c. In this case, the terminal device 100a may find an associated image cluster corresponding to the keyword "Little White" from the object feature library, and determine an expression image included in the associated image cluster corresponding to "Little White" as an image set. The expression image included in the associated image cluster corresponding to "Little White" may be displayed in a region 60d on the session page 60a.

Operation S208: Obtain a to-be-transformed expression image in response to a selection trigger operation performed by the target user in the image set, and extract a content feature corresponding to the to-be-transformed expression image.

For example, after the target user selects an expression image from the image set, if the target user further wants to edit the selected expression image to obtain a new expression image, the terminal device may determine, in response to the selection trigger operation performed by the target user in the image set, the expression image selected by the target user as a to-be-transformed expression image. The terminal device inputs the to-be-transformed expression image into an encoder, to obtain a content feature corresponding to the to-be-transformed expression image based on the encoder. The encoder may include a plurality of convolutional layers. The plurality of convolutional layers may be used for downsampling the to-be-transformed expression image, and extracting, from the to-be-transformed expression image, object details and texture-related feature information, that is, the content feature in the to-be-transformed expression image.

Operation S209: Obtain a target transform text corresponding to the to-be-transformed expression image, obtain an expression feature matching the target transform text, and generate a target expression image based on the content feature and the expression feature.

For example, the terminal device obtains the target transform text corresponding to the to-be-transformed expression image in response to a text selection operation performed by the target user for the to-be-transformed expression image, obtains the expression feature matching the target transform text from an expression feature library, inputs the expression feature and the content feature of the to-be-transformed expression image into a decoder, and fuses the expression feature and the content feature based on the decoder to generate the target expression image to be displayed on the session page.

Figure 8:
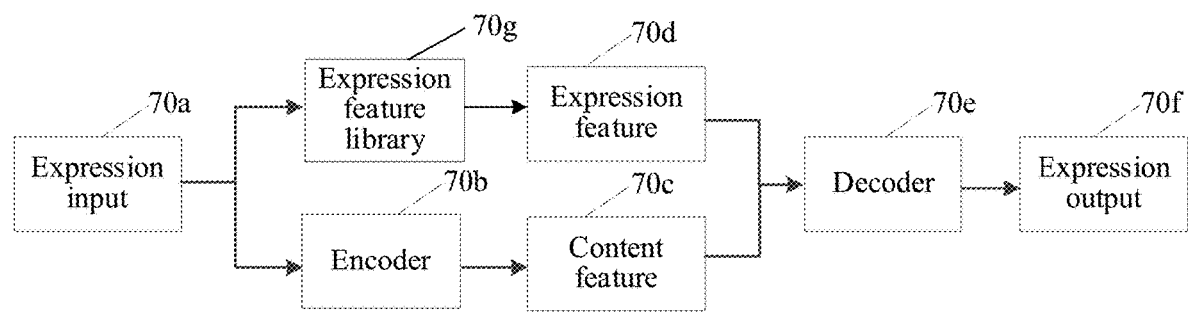
FIG. 8 is a schematic diagram of a method for generating a target expression image according to an embodiment of the disclosure.

FIG. 8 is a schematic diagram of a method for generating a target expression image according to an embodiment of the disclosure. As shown in FIG. 8, an expression input 70a may represent the to-be-selected expression image selected from the image set. The to-be-selected expression image is inputted into an encoder 70b. A content feature 70c of the to-be-selected expression image may be extracted by using the encoder 70b, and an expression feature 70d (which may be understood as including expression-related facial part feature information) corresponding to the target transform text selected by the target user may be obtained from an expression feature library 70g. The terminal device uses the content feature 70c and the expression feature 70d as inputs of a decoder 70e, to fuse the content feature 70c and the expression feature 70d to obtain an expression output 70f, which may also be referred to as a target expression image. Further, the target expression image may be sent to the session page for display. Therefore, by using encoding and decoding technologies, the to-be-selected expression image may be transformed into a target expression image as desired by the target user.

Figure 9:
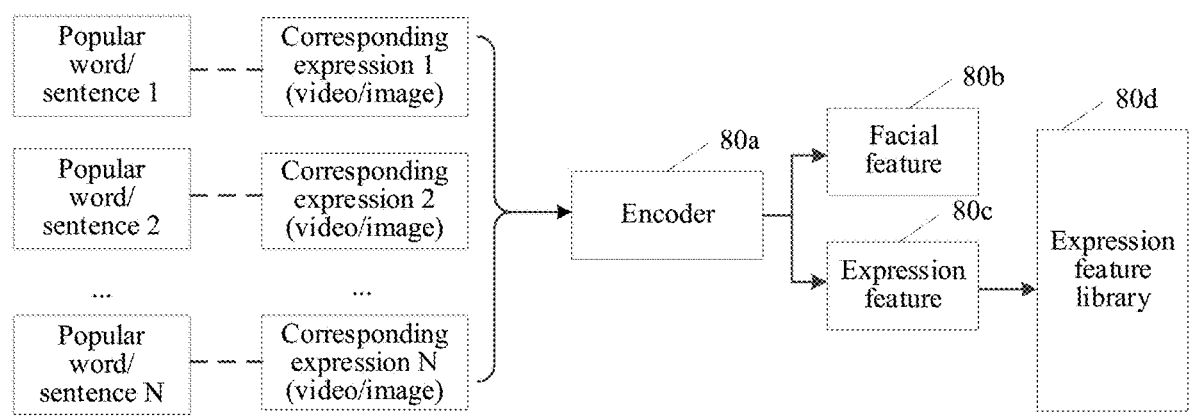
FIG. 9 is a schematic diagram of obtaining an expression feature library according to an embodiment of the disclosure.

The expression feature library may record a correspondence between a transform text and an expression feature, and store expression features corresponding to a plurality of transform texts. FIG. 9 is a schematic diagram of obtaining an expression feature library according to an embodiment of the disclosure. As shown in FIG. 9, the terminal device may collect existing popular words/sentences (which may also be referred to as transform texts) and expression images or videos corresponding to the popular words/sentences. That is, each of the popular words/sentences corresponds to an expression, and each expression is embodied in an image or a video. For example, a popular word/sentence 1 corresponds to an expression 1, a popular word/sentence 2 correspond to an expression 2, . . . , and a popular word/sentence N correspond to an expression N. The terminal device may input the expression image or videos corresponding to the popular words/sentences into an encoder 80a, to extract facial features 80b and expression features 80c from the expression images or videos corresponding to the popular words/sentences based on the encoder 80a. The terminal device stores the expression features 80c and the corresponding popular words/sentences to obtain an expression feature library 80d corresponding to the popular words/sentences. For example, feature information of the expression 1 may be extracted from an expression image or a video corresponding to the popular word/sentence 1 by using the encoder 80a. The expression feature library 80d may store the popular word/sentence 1, the feature information of the expression 1, and a correspondence between the popular word/sentence 1 and the feature information of the expression 1. In other words, the correspondence between the popular word/sentence and the expression image or the video may be transformed into a correspondence between the popular word/sentence and the expression feature by using the encoder 80a. The encoder 80a and the encoder 70e in the embodiment corresponding to FIG. 8 may be the same encoders, or may be different encoders. This is not limited herein.

It may be understood that, in the expression feature library, one popular word/sentence may correspond to one expression feature, or a plurality of popular words/sentences correspond to the same expression feature. For example, when semantic information of a plurality of popular words/sentences is similar, the plurality of popular words/sentences may correspond to the same expression feature.

Figure 10A:
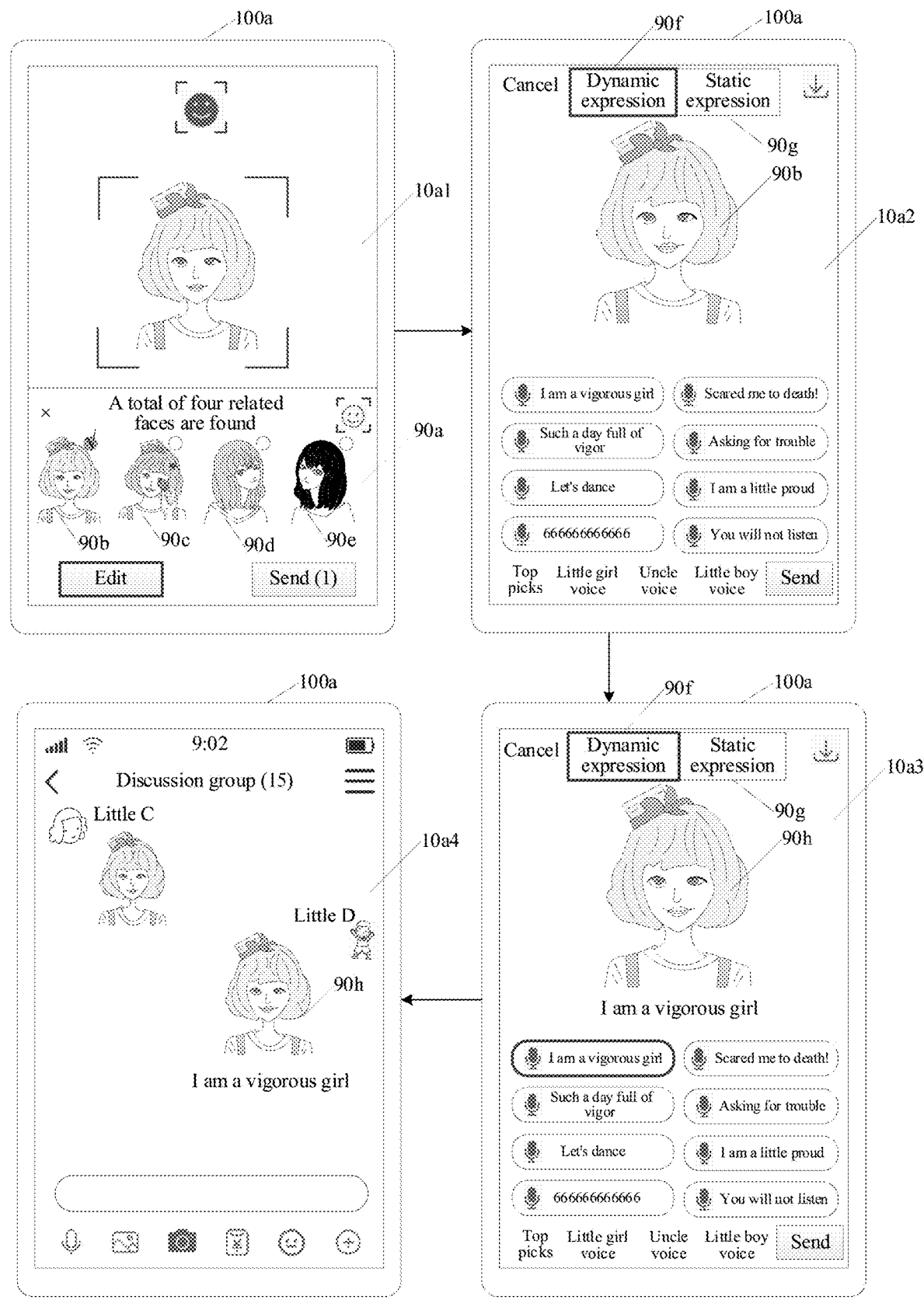
FIG. 10a and FIG. 10b are schematic page diagrams of another instant messaging-based image data processing method according to an embodiment of the disclosure.
Figure 10B:
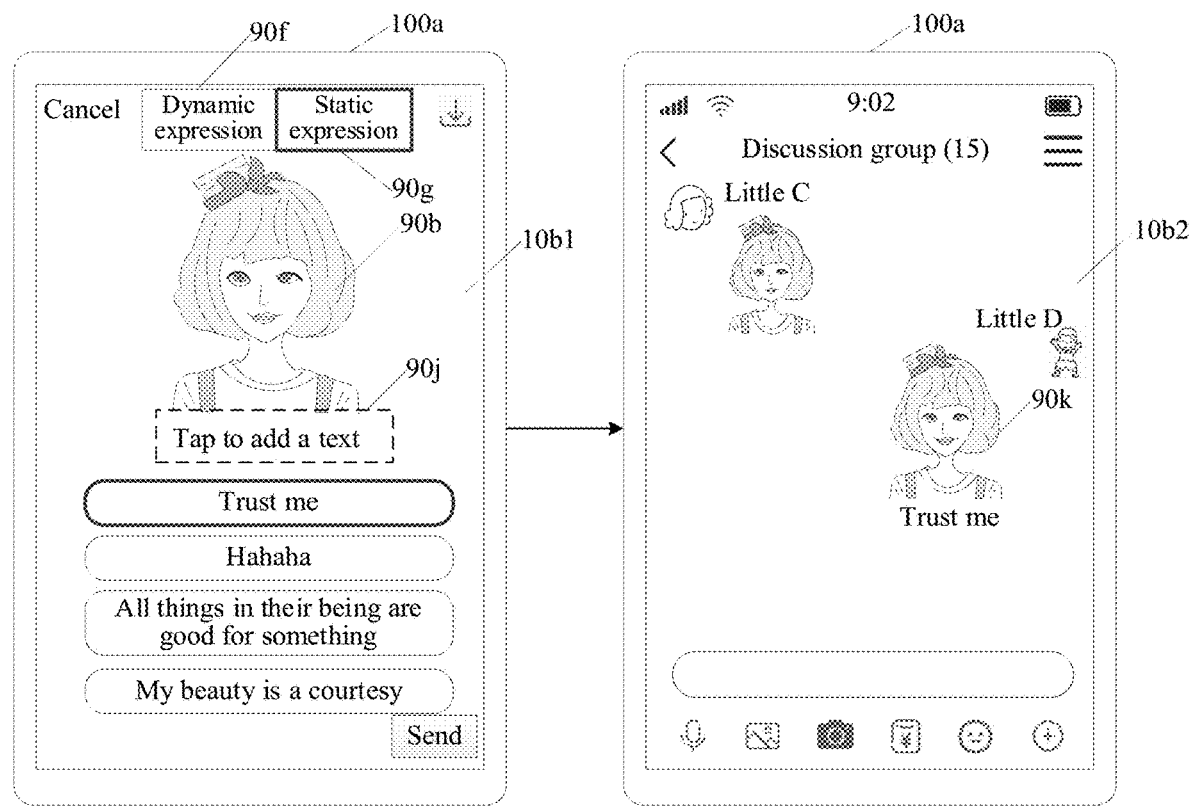

FIG. 10a and FIG. 10b are schematic page diagrams of another instant messaging-based image data processing method according to an embodiment of the disclosure. The target user may edit an expression image selected from an image set to generate a new expression image. FIG. 10a is a schematic page diagram of a process of generating a new expression image. In an example in which the operation object is image data, after an expression image is found from the object feature library, an image set may be displayed in a region 90a on the terminal device 100a. That is, expression image results, namely, an image 90b, an image 90c, an image 90d, and an image 90e, founded from the object feature library are displayed. The target user may select the image 90b from the image set as a to-be-selected expression image. After selecting the image 90b, the target user may select an "Edit" button in a selection region 90a to trigger the terminal device 100a to display an expression image editing page 10a2.

The expression image editing page 10a2 may display the image 90b and a plurality of transform texts, for example, "I am a vigorous girl", "Scared me to death", "Such a day full of vigor", "Asking for trouble", "Let's dance", and "I am a little proud". The plurality of transform texts displayed on the expression image editing page 10a2 may be popular words/sentences on the Internet. The expression image editing page 10a2 may provide expression type function options for the target user. Different expression type function options may be selected to achieve different expression image display effects. The expression type function options may include a dynamic expression 90f and a static expression 90g.

If the target user selects the dynamic expression 90f, the terminal device 100a may display a transform text corresponding to the dynamic expression 90f on the expression image editing page 10a2 in response to the expression type selection operation of the target user. Each transform text corresponds to an expression feature and an animation effect. When the target user selects "I am a vigorous girl" as a target transform text of the image 90b, the terminal device 100a may obtain an expression feature and an animation effect corresponding to the target transform text "I am a vigorous girl" from the expression feature library, extract a facial content feature of the image 90b, fuse the expression feature corresponding to the target transformed text "I am a vigorous girl" and the facial content feature of the image 90b, and add the target transform text "I am a vigorous girl" to the image 90b, so that a target expression image 90h may be obtained. In this case, the target expression image 90h has a dynamic expression. In other words, during a display process of the target expression image 90h, the animation effect matching "I am a vigorous girl" may be displayed, and a voice corresponding to "I am a vigorous girl" may be played.

In order to make a display effect of the target expression image 90h more interesting, the target user may select a type of voice change from a plurality of types of voice change provided by the instant messaging application for the user, to change a voice of the target transform text "I am a vigorous girl". The types of voice change may include a little girl voice, an uncle voice, a little boy voice, and voices of various cartoon characters. The target user may select any type of voice as the changed voice of "I am a vigorous girl". For example, "I am a vigorous girl" may be changed with a little girl voice. In this case, during the display of the target expression image 90h, "I am a vigorous girl" may be played in a little girl voice. After the voice change of the target expression image 90h is determined, the target user may preview an animation effect of the target expression image 90h. If the animation effect does not satisfy the target user, the target user may cancel the expression editing, or reselect a transform text to transform the image 90b. If the animation effect satisfies the target user, the target user may click/tap a "Send" button on the expression image editing page to trigger the terminal device 100a to send the target expression image 90h to a session page 10a4, so that users in the group may view the target expression image 90h.

If the target user selects the static expression 90g, the terminal device 100a may display a transform text corresponding to the static expression 90g on an expression image editing page 10b1 in response to the expression type selection operation of the target user. Each transform text corresponds to an expression feature. For example, a transform text "Hahaha" may correspond to an expression feature of laugh. All transform texts displayed on the expression image editing page 10b1 are popular words/sentences stored in the expression feature library. As shown in FIG. 10b, when the target user selects "Trust me" as a target transform text corresponding to the image 90b, the terminal device 100a may obtain an expression feature corresponding to the target transform text "Trust me" from the expression feature library, fuse the expression feature corresponding to the target transform text "Trust me" and the facial content feature of the image 90b, and add the target transform text "Trust me" to the image 90b to obtain a target expression image 90k. In this case, the target expression image 90k is a static expression, and an expression corresponding to the target expression image 90k is an expression corresponding to "Trust me".

It may be understood that, a difference between the target transform texts displayed on the expression image editing page in the case of selecting the dynamic expression 90f and the target transform texts displayed in the case of selecting the static expression 90g lies in that, all the target transform texts displayed in the case of selecting the dynamic expression 90f correspond to expression features with animation effects and may be played in a voice, while the target transform texts displayed in the case of selecting the static expression 90g correspond to only expression features. In an embodiment, the target transform texts displayed in the case of selecting the dynamic expression 90f and the target transform texts displayed in the case of selecting the static expression 90g may be the same or may be different. This is not limited herein.

In an embodiment, in FIG. 10b, the target user may manually add a target transform text for the image 90b on a page 10a3. For example, if the target transform text added by the target user for the image 90b is "I am a little proud", the terminal device 100 may search the expression feature library for the target transform text. If the expression feature library includes the target transform text "I am a little proud", the terminal device obtains an expression feature corresponding to the target transform text "I am a little proud" from the expression feature library, and fuses the expression feature corresponding to "I am a little proud" and the facial content feature corresponding to the image 90b to obtain the target expression image 90k. If the expression feature library does not include the target transform text "I am a little proud", the terminal device calculates similarities between the target transform text "I am a little proud" and the popular words/sentences included in the expression feature library, determines an expression feature corresponding to a popular word/sentence with the highest similarity as the expression feature of the target transform text "I am a little proud", to obtain the target expression image 90k.

After the target expression image 90k is determined, if the target expression image does not satisfy the target user, the target user may cancel the expression editing or reselect a transform text to transform the image 90b. If the target expression image satisfies the target user, the target user may click/tap the "Send" button on the expression image editing page to trigger the terminal device 100a to send the target expression image 90k to a session page 90i, so that the users in the group may view the target expression image 90k.

Figure 11:
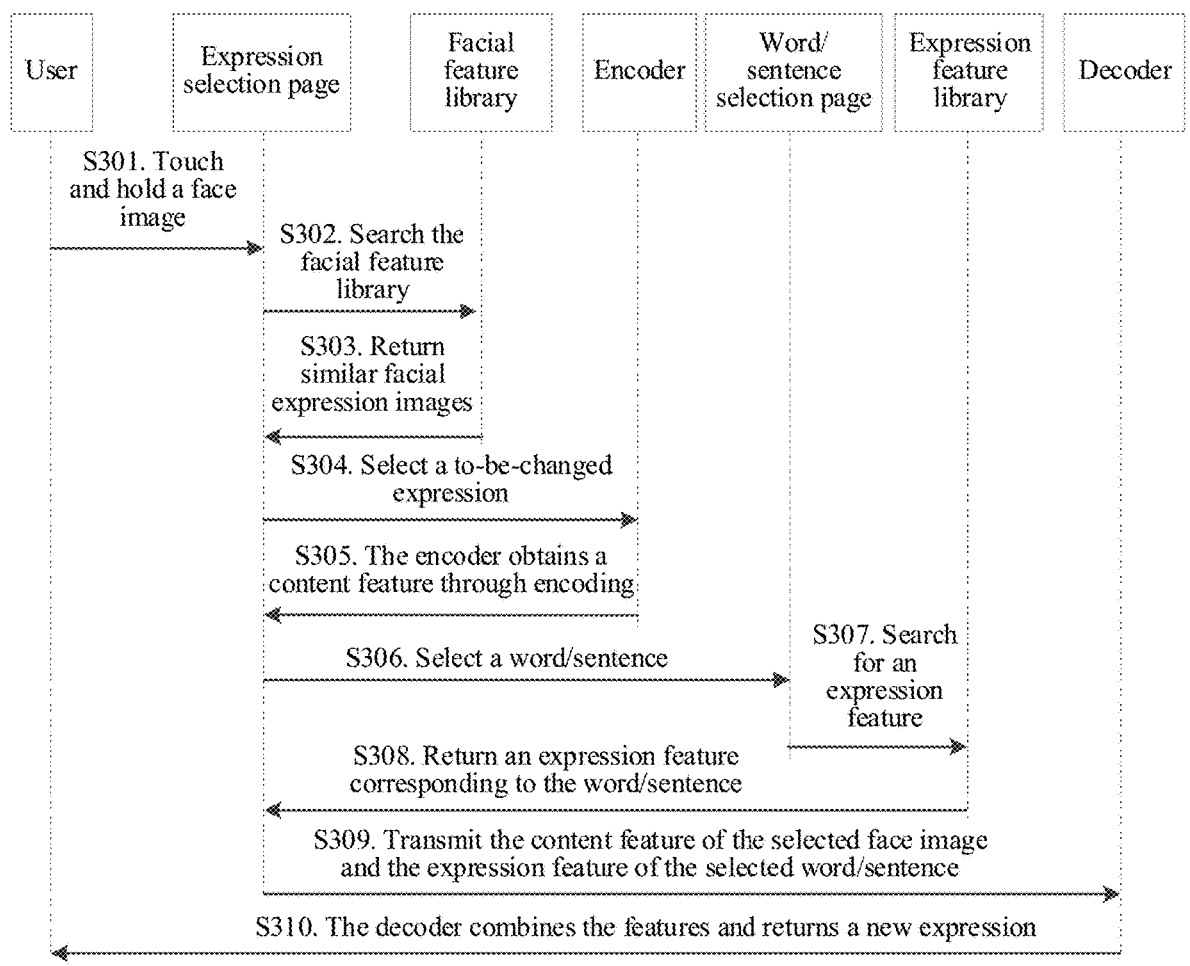
FIG. 11 is a timing diagram of an instant messaging-based image data processing method according to an embodiment of the disclosure.

FIG. 11 is a timing diagram of an instant messaging-based image data processing method according to an embodiment of the disclosure. As shown in FIG. 11, the image data processing method is described in detail by using an example in which the operation object is face image data. The method is performed by an electronic device, for example, any one of the terminal device 100a, 100b, 100c shown in FIG. 1. A facial feature library and an expression feature library may be obtained by the terminal in advance or obtained by the terminal from a server. The method may be implemented based on an expression selection page (which may be understood as a display page of the foregoing image set), the facial feature library (which may also be referred to as an object feature library), an encoder, a word/sentence selection page (corresponding to the expression image editing pages in the embodiments corresponding to FIG. 10a and FIG. 10b), the expression feature library, and a decoder.

S301: Touch and hold a face image.

Specifically, on a session page of an instant messaging application, a user may touch and hold a face image on the session page, to trigger the terminal device to display an expression management menu bar (corresponding to the menu bar 20c in the embodiment corresponding to FIG. 5a) on the session page. When the user clicks/taps a "search for expressions" function button in the expression management menu bar, the terminal device may jump from the session page to the expression selection page, and obtain the face image. In an embodiment, the user may alternatively force touch the face image on the session page to trigger the terminal device to jump from the session page to the expression selection page. The user may alternatively click/tap the face image to display the face image and position the face image.

S302: Search the facial feature library.

Specifically, the terminal device may extract a facial feature in the face image, search the facial feature library for the facial feature, that is, calculate similarities between the facial feature and a plurality of facial features included in the facial feature library, and search the facial feature library for a facial expression image similar to the facial feature according to the similarities. The facial feature library includes a plurality of facial features and associated image clusters respectively corresponding to the plurality of facial features. Therefore, in a process of searching the facial feature library for the facial feature, the terminal device may calculate similarities between the facial feature and the plurality of facial features, and determine all expression images included in an associated image cluster to which a facial feature with the highest similarity belongs as facial expression images similar to the facial feature.

S303: Return the similar facial expression images.

Specifically, after the facial feature search process is completed in the facial feature library, the facial feature library may determine the associated image cluster to which the facial expression images similar to the facial feature belongs as a target image cluster of the face image, and return all facial expression images in the target image cluster to the expression selection page.

S304: Select a to-be-changed expression.

Specifically, the user may select, from all the facial expression images on the expression selection page that are returned by the facial feature library, an expression image that needs an expression change, which may be referred to as a to-be-selected expression image. After the user selects the to-be-selected expression image, the terminal device may obtain the to-be-selected expression image and input the to-be-selected expression image into the encoder.

S305: The encoder obtains a content feature through encoding.

Specifically, the encoder may encode the to-be-selected expression image that is input to the encoder, extract the content feature in the to-be-selected expression image, and return the content feature to the expression selection page. If the encoder includes a plurality of convolutional layers, an encoding process includes: performing convolution operations on the input to-be-selected expression image by using the convolutional layers in the encoder (an output of a previous convolutional layer may be used as an input of a current convolutional layer), to extract features from the to-be-selected expression image to obtain a feature map corresponding to the to-be-selected expression image, that is, the content feature corresponding to the to-be-selected expression image.

S306: Select a word/sentence.

Specifically, the user may select a target change word/sentence (which may be referred as a target transform text) from words/sentences (which may be referred as transform texts) displayed on a word/sentence selection page. For example, if the word/sentence selection page displays words/sentences such as "I am a vigorous girl", "Scared me to death", "Such a day full of vigor", and "Asking for trouble", the user may select a word/sentence (for example, "Asking for trouble") from the plurality of displayed words/sentences as the target change word/sentence according to a requirement. The user may alternatively select a popular word/sentence from the Internet as the target change word/sentence and manually enter the popular word/sentence, so that the terminal device may obtain the target change word/sentence.

S307: Search for an expression feature.

Specifically, after the user determines the target change word/sentence, the terminal device may obtain the target change word/sentence, and search the expression feature library for an expression feature matching the target change word/sentence. The terminal device may traverse all popular words/sentences stored in the expression feature library. If the expression feature library stores the target change word/sentence, an expression feature associated with the target change word/sentence may be determined according to a correspondence between the popular word/sentence and the expression feature. If the expression feature library does not store the target change word/sentence, similarities between the target change word/sentence and the popular words/sentences stored in the expression feature library are calculated, and a popular word/sentence with the highest semantic similarity is determined as the expression feature associated with the target change word/sentence.

S308: Return the expression feature corresponding to the word/sentence.

Specifically, the expression feature library may return the expression feature matching the target change word/sentence to the expression selection page.

S309: Transmit the content feature of the selected face image and the expression feature of the selected word/sentence.

Specifically, the content feature in the to-be-selected expression image and the expression feature corresponding to the target change word/sentence are transmitted to the decoder. That is, the content feature in the to-be-selected expression image and the expression feature corresponding to the target change word/sentence are used as inputs of the decoder.

S310: The decoder combines the features and returns a new expression.

Specifically, the decoder may fuse the content feature in the to-be-selected expression image and the expression feature corresponding to the target change word/sentence to obtain a new expression image, which may be referred to as a target expression image, and return the new expression image to the expression selection page.

Figure 12A:
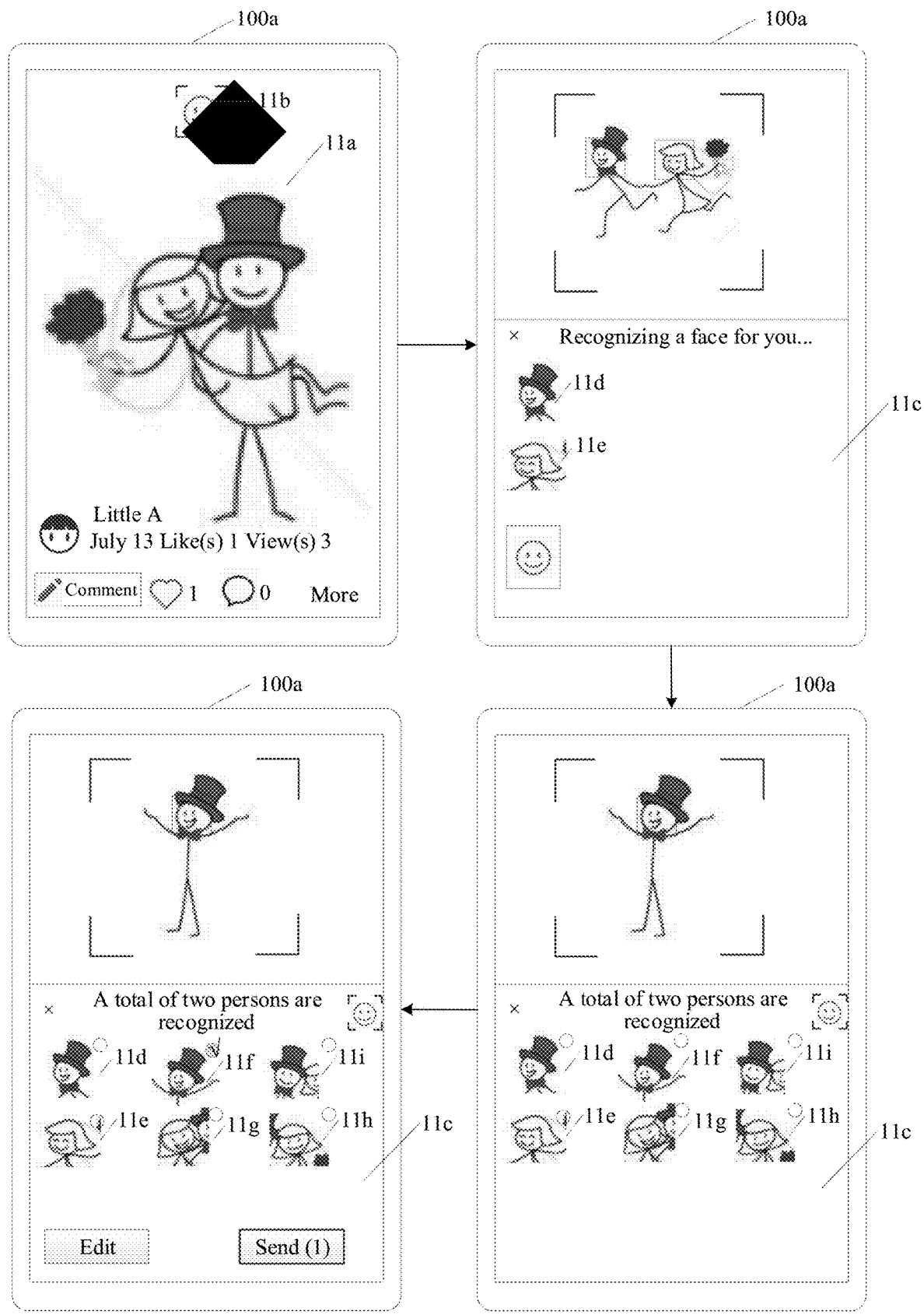
FIG. 12a and FIG. 12b are schematic page diagrams of another instant messaging-based image data processing method according to an embodiment of the disclosure.
Figure 12B:
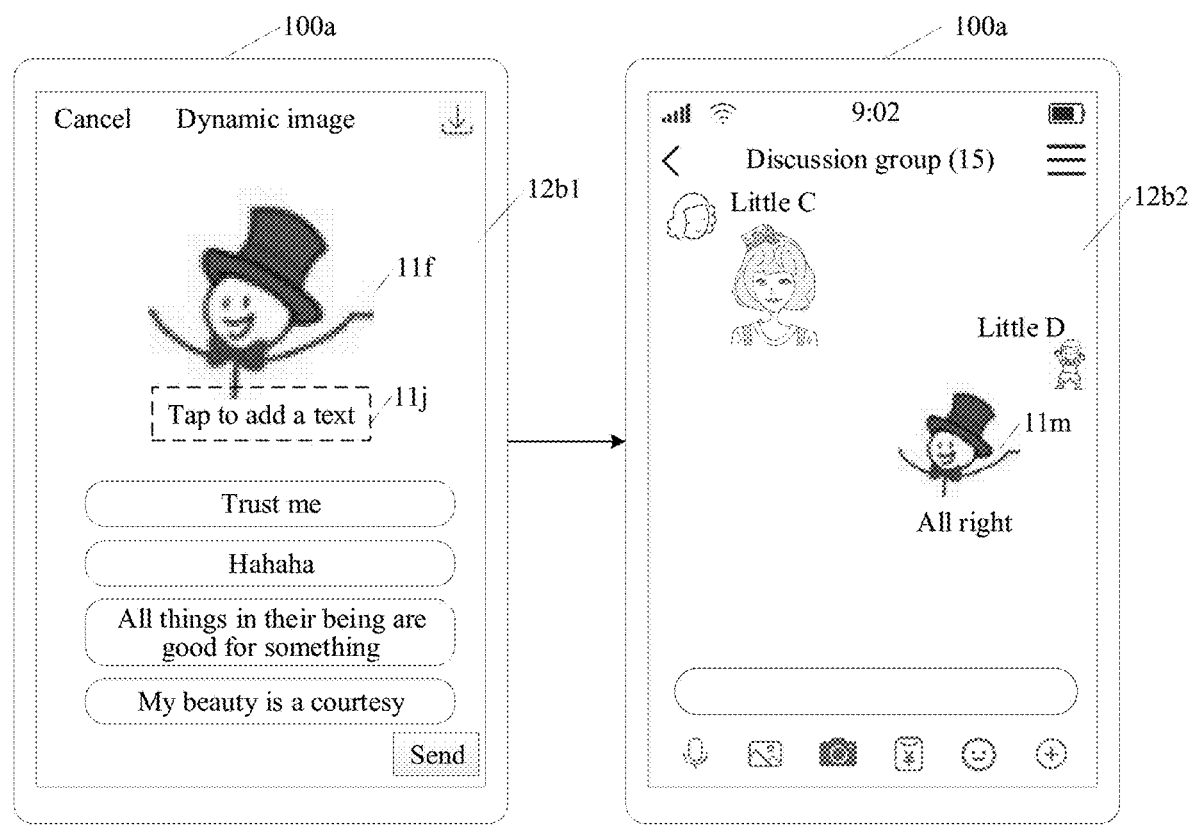

In an embodiment, the terminal device may alternatively obtain a target expression image from video data. FIG. 12a and FIG. 12b are schematic page diagrams of another instant messaging-based image data processing method according to an embodiment of the disclosure. The terminal device may obtain video data, and obtain an image dataset including a face image from the video data. The image dataset includes a plurality of pieces of image data. Each of the plurality of pieces of image data is at least one frame of an image including the face in the video data. That is, each piece of image data may be a static image or a dynamic image, and is a part of data clipped from the video data. Target image data is selected from the image dataset, and a description text is added to the target image data. The target image data added with the description text is determined as an expression image. The terminal device may store the target expression image into the object feature library, or may send the expression image to a session page, for users in a group on the session page to view the expression image.

As shown in FIG. 12a, the terminal device 100a may obtain video data 11a, and display publisher information (such as name and avatar information of a publisher), a publishing time, a quantity of likes, a quantity of comments, and a quantity of views of the video data 11a on a terminal page. When the target user clicks/taps a face search entry 11b on the terminal page, the terminal device 100a may perform facial recognition on each frame of an image in the video data 11a in response to the click/tap operation of the target user on the face search entry 11b, clip one or more consecutive frames of images including a face image from the video data 11a, and display the clipped image data in a region 11c. The clipped one or more frames of images may be referred to as one or more expression images obtained from the video data 11a. After the recognition is completed, the terminal device 100a may display the image data according to recognized persons. That is, image data including the same face is displayed in the same region. For example, if the terminal device 100a recognizes a total of two persons, namely, a boy 1 and a girl 1, from the video data 11a, the clipped images may be displayed in the region 11c according to the boy 1 and the girl 1. For example, an image 11d, an image 11f, and an image 11i are image data corresponding to the boy 1, and an image 11e, an image 11g, and an image 11h are image data corresponding to the girl 1. The plurality of consecutive frames of images clipped from the video data 11a may be understood as a short video that includes a face image and is clipped from the video data 11a, for example, a video that includes a face image and lasts two seconds in the video data 11a.

The target user may select the image 11f as to-be-selected image data from the clipped image data, and click/tap an "Edit" button to trigger the terminal device 100a to jump to an image editing page. If the image 11f selected by the target user includes a plurality of frames of images, which may also be referred to as a dynamic image, the target user may add a description text to the image 11f on the image editing page to generate a new expression image. If the image 11f selected by the target user is a single frame of an image, which may also be referred to as a static image, the target user may add a description text to the image 11f on the image editing page, or select a target transform text for the image 11f to perform expression transformation on the image 11f. For an example process of the expression transformation, reference may be made to the descriptions of the embodiment corresponding to FIG. 10b. Details are not described herein again.

Descriptions are made by using an example in which the image 11f is a dynamic image. As shown in FIG. 12b, after the terminal device 100a jumps to an expression image editing page 12b1 in response to the click/tap operation of the target user, the expression image editing page 12b1 may display a plurality of description texts, for example, "Trust me" and "All things in their being are good for something". After the target user selects a description text, the terminal device 100a may add the description text selected by the target user to the image 11f to generate a new expression image. In an embodiment, the target user may alternatively click/tap a region (e.g., description text input region) 11j on the expression image editing page 12b1, and manually enter a description text. The terminal device 100a may add the description text manually entered by the target user to the image 11f to generate a new expression image. The target user may choose to send the generated new expression image (for example, an expression image 11m) to a session page 12b2.

In the instant messaging application, when the user is watching or viewing video data, a face may be detected in real time, and a segment of a dynamic face may be directly clipped and displayed in the form of a dynamic image. The displayed dynamic face image is used as an expression image, which may be sent directly or edited. That is, the user may directly make an expression image in the instant messaging application without a third-party platform, thereby improving the expression image processing efficiency.

In the foregoing embodiments of the disclosure, in an instant messaging application, various manners such as facial recognition and matching, expression classification based on an associated user, expression symbol matching, and keyword matching may be provided for a use to search for an expression image, so that the user may quickly find an expression image that the user wants to display, thereby improving the image data processing efficiency. In addition, the user may edit the found expression image in the instant messaging application, to obtain more types of expression images.

Figure 13:
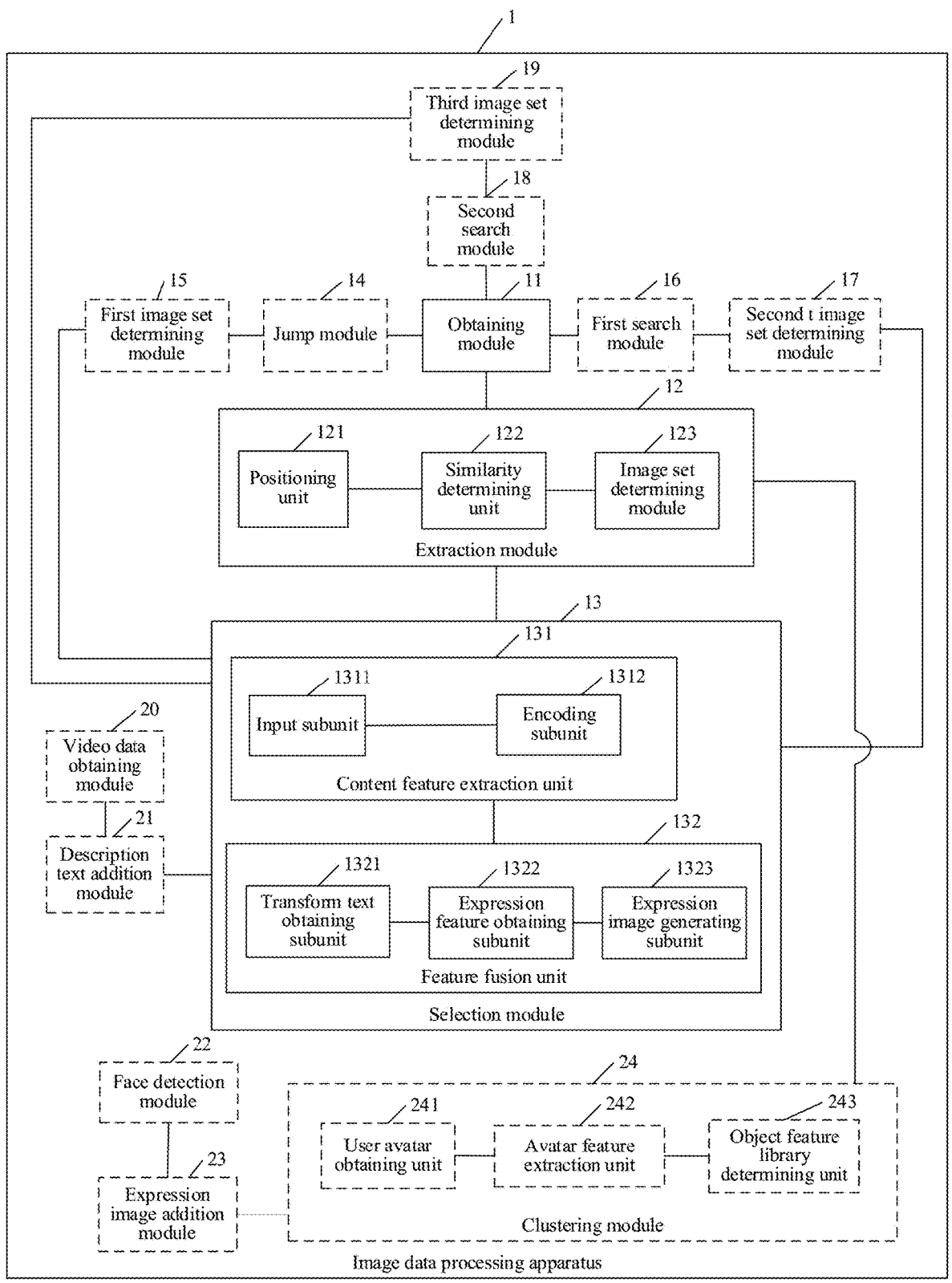
FIG. 13 is a schematic structural diagram of an image data processing apparatus according to an embodiment of the disclosure.

FIG. 13 is a schematic structural diagram of an image data processing apparatus according to an embodiment of the disclosure. As shown in FIG. 13, an image data processing apparatus 1 may include: an obtaining module 11, an extraction module 12, and a selection module 13.

The obtaining module 11 is configured to obtain, in response to an expression image trigger operation of a target user, an operation object associated with the expression image trigger operation on a session page of an instant messaging application.

The extraction module 12 is configured to extract, when the operation object is image data, a target object feature in the image data, and obtain a first image set associated with the target object feature from an object feature library.

The selection module 13 is configured to determine a target expression image in response to a selection trigger operation performed by the target user in the first image set, and display the target expression image on the session page.

For specific functional implementations of the obtaining module 11, the extraction module 12, and the selection module 13, reference may be made to operations S101 to S103 in the embodiment corresponding to FIG. 3, and details are not described herein again.

Referring to FIG. 13, the image data processing apparatus 1 may further include: a jump module 14, a first image set determining module 15, a first search module 16, a second image set determining module 17, a second search module 18, a third image set determining module 19, a video data obtaining module 20, a description text addition module 21, a face detection module 22, an expression image addition module 23, and a clustering module 24.

The jump module 14 is configured to jump from the session page to an expression classification page when the operation object is a classification label, and display, on the expression classification page, a plurality of associated image clusters in the object feature library that correspond to the classification label.

The first image set determining module 15 is configured to determine an expression image included in a selected associated image cluster as a second image set in response to a cluster selection operation performed by the target user in the plurality of displayed associated image clusters.

The first search module 16 is configured to search, when the operation object is symbol information, the object feature library for a plurality of associated image clusters associated with the symbol information, and display the plurality of found associated image clusters on the session page.

The second image set determining module 17 is configured to determine an expression image included in a selected associated image cluster as a third image set in response to a cluster selection operation performed by the target user in the plurality of displayed associated image clusters.

The second search module 18 is configured to extract, when the operation object is a keyword, semantic information of the keyword, and search the object feature library for a to-be-selected expression image (or candidate expression image) matching the semantic information.

The third image set determining module 19 is configured to obtain user information on the session page, determine an associated image cluster corresponding to the user information from the object feature library, and determine a to-be-selected expression image included in the determined associated image cluster as a fourth image set.

The video data obtaining module 20 is configured to obtain video data, and obtain an image dataset including an object from the video data, the image dataset including a plurality of pieces of image data, and each of the plurality of pieces of image data being at least one frame of an image including the object in the video data.

The description text addition module 21 is configured to select target image data from the image dataset, add a description text to the target image data, determine the target image data added with the description text as an expression image, and store the target image data into the object feature library.

The face detection module 22 is configured to obtain historical message images of the target user, and perform face detection on the historical message images.

The expression image addition module 23 is configured to determine historical message images including a face image as expression images.

The clustering module 24 is configured to extract facial features corresponding to the expression images included in the expression image library, and cluster the facial features to obtain the object feature library, the object feature library including expression images respectively corresponding to a plurality of facial features.

Referring to FIG. 13, the extraction module 12 may include: a positioning unit 121, a similarity determining unit 122, and an image set determining unit 123.

The positioning unit 121 is configured to position a target object included in the image data, and extract the target object feature of the target object.

The similarity determining unit 122 is configured to determine similarities between the target object feature and the plurality of object features included in the object feature library, and determine an associated image cluster to which an object feature with the largest similarity belongs as a target image cluster corresponding to the target object feature.

The image set determining unit 123 is configured to determine an expression image included in the target image cluster as the first image set.

Referring to FIG. 13, the selection module 13 may include: a content feature extraction unit 131 and a feature fusion unit 132.

The content feature extraction unit 131 is configured to obtain a to-be-transformed expression image in response to the selection trigger operation, and extract a content feature corresponding to the to-be-transformed expression image; and
  obtain a target transform text corresponding to the to-be-transformed expression image, obtain an expression feature matching the target transform text, and generate the target expression image based on the content feature and the expression feature.

Referring to FIG. 13, the clustering module 24 may include: a user avatar obtaining unit 241, an avatar feature extraction unit 242, and an object feature library determining unit 243.

The user avatar obtaining unit 241 is configured to obtain an associated user avatar of an associated user of the target user.

The avatar feature extraction unit 242 is configured to extract, when the associated user avatar includes a face image, an avatar feature from the associated user avatar including the face.

The object feature library determining unit 243 is configured to determine an expression image associated with the avatar feature according to similarities between the avatar feature and the facial features, and cluster the expression image into an associated image cluster; and form the object feature library by using associated image clusters respectively matching associated users, each of the associated image clusters including at least one expression image corresponding to an associated user avatar.

Referring to FIG. 13, the content feature extraction unit 131 may include: an input subunit 1311 and an encoding subunit 1312.

The input subunit 1311 is configured to obtain a to-be-transformed expression image in response to the selection trigger operation, and input the to-be-transformed expression image into an encoder.

The encoding subunit 1312 is configured to encode the to-be-transformed expression image based on the encoder, to obtain the content feature corresponding to the to-be-transformed expression image.

Referring to FIG. 13, the feature fusion unit 132 may include: a transform text obtaining subunit 1321, an expression feature obtaining subunit 1322, and an expression image generating subunit 1323.

The transform text obtaining subunit 1321 is configured to obtain the target transform text in response to a text selection operation performed by the target user for the to-be-transformed expression image.

The expression feature obtaining subunit 1322 is configured to obtain the expression feature matching the target transform text from an expression feature library.

The expression image generating subunit 1323 is configured to input the expression feature and the content feature into a decoder, and fuse the expression feature and the content feature based on the decoder to generate the target expression image.

Figure 14:
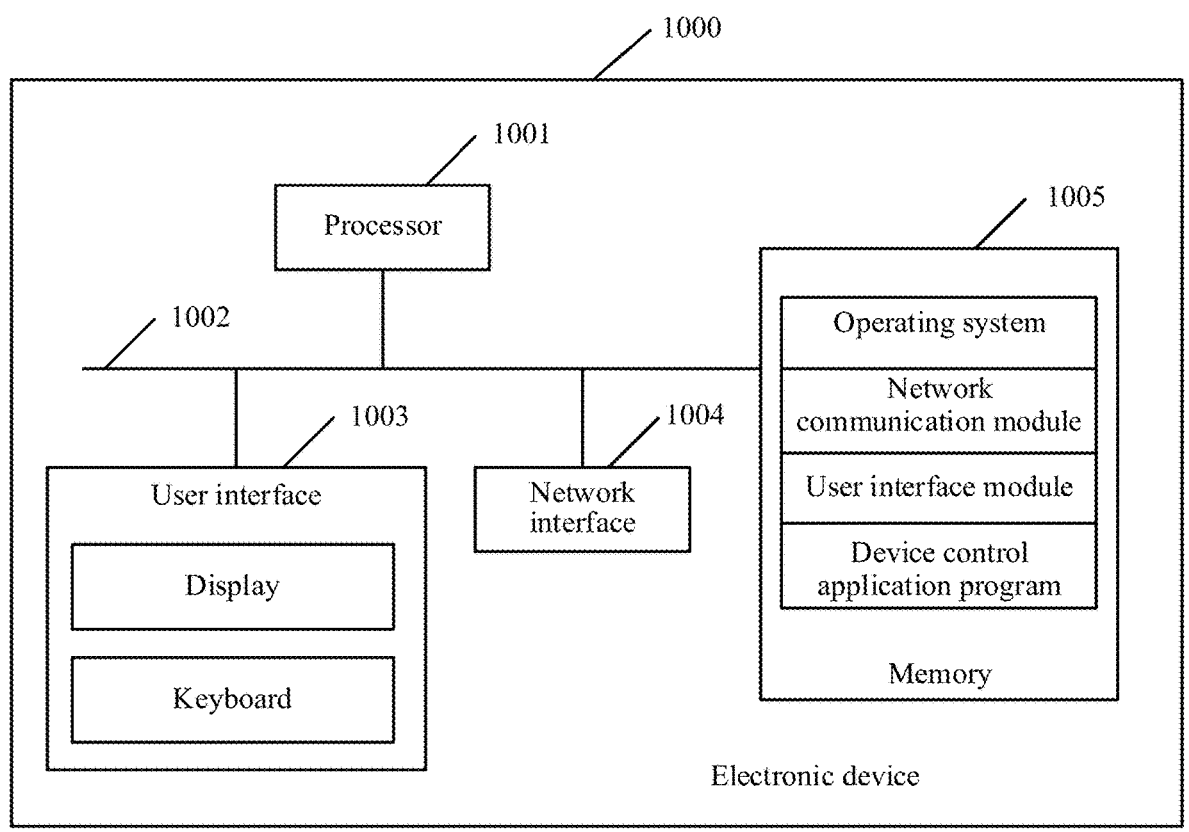
FIG. 14 is a schematic structural diagram of an electronic device according to an embodiment of the disclosure.

FIG. 14 is a schematic structural diagram of an electronic device according to an embodiment of the disclosure. As shown in FIG. 14, an electronic device 1000 may include: a processor 1001, a network interface 1004, and a memory 1005. In addition, the electronic device 1000 may further include a user interface 1003 and at least one communication bus 1002. The communication bus 1002 is configured to implement connection and communication between the components. The user interface 1003 may include a display and a keyboard, and in an embodiment, the user interface 1003 may further include a standard wired interface and a standard wireless interface. In an embodiment, the network interface 1004 may include a standard wired interface and a standard wireless interface (such as a Wi-Fi interface). The memory 1004 may be a high-speed random access memory (RAM), or may be a non-volatile memory, for example, at least one magnetic disk memory. In an embodiment, the memory 1005 may be at least one storage apparatus that is located far away from the foregoing processor 1001. As shown in FIG. 14, the memory 1005, which is used as a computer-readable storage medium, may include an operating system, a network communications module, a user interface module, and a device control application program.

In the electronic device 1000 shown in FIG. 14, the network interface 1004 may provide a network communication function, and the user interface 1003 is mainly configured to provide an input interface for a user. The processor 1001 may be configured to invoke a device control application program stored in the memory 1005, to implement the descriptions of the image data processing method in any one of the foregoing embodiments corresponding to FIG. 3 and FIG. 6, or may implement the foregoing descriptions of the image data processing apparatus 1 in the embodiment corresponding to FIG. 13. Details are not described herein again. In addition, the description of beneficial effects of the same method are not described herein again.

In addition, an embodiment of the disclosure further provides a computer-readable storage medium. The computer-readable storage medium stores a computer program executed by the image data processing apparatus 1 described above, and the computer program includes program instructions. When executing the program instructions, the processor may implement the descriptions of the image data processing method in any one of the foregoing embodiments corresponding to FIG. 3 and FIG. 6. Therefore, details are not described herein again. In addition, the description of beneficial effects of the same method are not described herein again. For technical details that are not disclosed in the embodiments of the computer-readable storage medium of the disclosure, refer to the method embodiments of the disclosure.

A person of ordinary skill in the art would understand that all or some of procedures of the method in the foregoing embodiments may be implemented by a computer program instructing relevant hardware. The program may be stored in a computer-readable storage medium. When the program is executed, the procedures of the foregoing method embodiments may be implemented. The storage medium may be a magnetic disc, an optical disc, a read-only memory (ROM), or a RAM.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

What is disclosed above is merely example embodiments of the disclosure, and certainly is not intended to limit the scope of the claims of the disclosure. Therefore, equivalent variations made in accordance with the claims of the disclosure shall fall within the scope of the disclosure.

What is claimed is:

1. An image data processing method, performed by an electronic device, the method comprising:
    receiving an expression image trigger operation of a target user in a state in which a session page of an instant messaging application between the target user and an associated user is displayed;
    obtaining, in response to the expression image trigger operation of the target user, an operation object associated with the expression image trigger operation on the session page of the instant messaging application;
    based on the operation object being image data sent from the associated user and displayed on the session page and on which the expression image trigger operation having been performed, extracting a target object feature in the image data, and obtaining, from an object feature library, a first image set based on similarities between with the target object feature and expression images of the first image set; and
    switching from the session page to an expression image search page that displays at least one expression image included in the first image set, determining a target expression image in response to a selection trigger operation of the target user among the first image set, and displaying the target expression image on the session page,
    wherein the extracting the target object feature and obtaining the first image set comprises:
    performing face positioning on the image data, and extracting facial features from the face positioning;
    determining similarities between the extracted facial features and a plurality of object features included in the object feature library; and
    determining the first image set based on the similarities between extracted facial features and the plurality of object features.

2. The method according to claim 1, wherein the object feature library comprises the plurality of object features and expression images corresponding to the plurality of object features, and expression images corresponding to similar object features are clustered into an associated image cluster, and
    wherein the determining the first image set comprises:
    determining an associated image cluster to which an object feature with a largest similarity belongs as a target image cluster corresponding to the extracted facial features; and
    determining at least one expression image included in the target image cluster as the first image set.

3. The method according to claim 1, wherein the object feature library comprises a plurality of associated image clusters, and expression images in each of the plurality of associated image clusters have similar object features; and
    the method further comprises:
    based on the operation object being a classification label, jumping from the session page to an expression classification page, and displaying, on the expression classification page, a plurality of associated image clusters in the object feature library that correspond to the classification label; and
    determining at least one expression image included in a selected associated image cluster as a second image set in response to a cluster selection operation of the target user among the plurality of displayed associated image clusters.

4. The method according to claim 1, wherein the object feature library comprises a plurality of associated image clusters, and expression images in each of the plurality of associated image clusters have similar object features; and the method further comprises:

based on the operation object being symbol information, searching the object feature library for a plurality of associated image clusters associated with the symbol information, and displaying the plurality of found associated image clusters on the session page; and determining an expression image included in a selected associated image cluster as a third image set in response to a cluster selection operation of the target user in the plurality of displayed associated image clusters.

5. The method according to claim 1, wherein the object feature library comprises a plurality of associated image clusters, expression images in each of the plurality of associated image clusters have similar object features, and each associated image cluster corresponds to the associated user of the target user in the instant messaging application; and the method further comprises:

based on the operation object being a keyword, extracting semantic information of the keyword, and searching the object feature library for a candidate expression image matching the semantic information; and obtaining user information on the session page, determining an associated image cluster corresponding to the user information from the object feature library, and determining a candidate expression image included in the determined associated image cluster as a fourth image set.

6. The method according to claim 1, wherein the determining the target expression image comprises:

obtaining a to-be-transformed expression image in response to the selection trigger operation, and extracting a content feature corresponding to the to-be-transformed expression image; and obtaining a target transform text corresponding to the to-be-transformed expression image, obtaining an expression feature matching the target transform text, and generating the target expression image based on the content feature and the expression feature.

7. The method according to claim 6, wherein the extracting the content feature corresponding to the to-be-transformed expression image comprises:

inputting the to-be-transformed expression image into an encoder; and encoding the to-be-transformed expression image based on the encoder, to obtain the content feature corresponding to the to-be-transformed expression image.

8. The method according to claim 6, wherein the obtaining the target transform text comprises:

obtaining the target transform text in response to a text selection operation of the target user for the to-be-transformed expression image;

the obtaining the expression feature matching the target transform text comprises:

obtaining the expression feature matching the target transform text from an expression feature library; and the generating the target expression image based on the content feature and the expression feature comprises:

inputting the expression feature and the content feature into a decoder, and fusing the expression feature and the content feature based on the decoder to generate the target expression image.

9. The method according to claim 1, further comprising:

obtaining video data, and obtaining an image dataset comprising an object from the video data, the image dataset comprising a plurality of pieces of image data, and each of the plurality of pieces of image data being at least one frame of an image comprising the object in the video data; and selecting target image data from the image dataset, adding a description text to the target image data, determining the target image data added with the description text as an expression image, and storing the target image data into the object feature library.

10. The method according to claim 1, further comprising:

obtaining historical message images of the target user, and performing face detection on the historical message images;

determining historical message images comprising a face image as expression images; and extracting facial features corresponding to the expression images, and clustering the facial features to obtain the object feature library, the object feature library comprising expression images respectively corresponding to a plurality of facial features.

11. The method according to claim 10, wherein the clustering the facial features to obtain the object feature library comprises:

obtaining an associated user avatar of the associated user of the target user;

based on the associated user avatar comprising a face image, extracting an avatar feature from the associated user avatar;

determining an expression image associated with the avatar feature according to similarities between the avatar feature and the facial features, and clustering the expression image into an associated image cluster; and forming the object feature library by using associated image clusters respectively matching associated users, each of the associated image clusters comprising at least one expression image corresponding to the associated user avatar.

12. An electronic device, comprising: a processor and a memory, the processor being connected to the memory, the memory being configured to store a computer program, and the processor being configured to invoke the computer program, to perform the method according to claim 1.

13. The method according to claim 1, wherein the switching comprises, based on the operation object being the image data:

when the expression image trigger operation is a touch operation of a first type on the operation object, displaying a menu including function options of the operation object and, based on a function option corresponding to an expression image search, displaying the expression image search page; and when the expression image trigger operation is a touch operation of a second type on the operation object, the second type being different from the first type, directly jumping from the session page to the expression image search page.

14. An image data processing apparatus, comprising:

at least one memory configured to store program code; and at least one processor configured to read the program code and operate as instructed by the program code, the program code comprising:

receiving code configured to cause the at least one processor to receive an expression image trigger operation of a target user in a state in which a session page of an instant messaging application between the target user and an associated user is displayed;

obtaining code configured to cause the at least one processor to obtain, in response to the expression image trigger operation of the target user, an operation object associated with the expression image trigger operation on the session page of the instant messaging application;

extraction code configured to cause the at least one processor to, based on the operation object being image data sent from the associated user and displayed on the session page and on which the expression image trigger operation having been performed, extract a target object feature in the image data, and obtain, from an object feature library, a first image set based on similarities between with the target object feature and expression images of the first image set; and selection code configured to cause the at least one processor to switch from the session page to an expression image search page that displays at least one expression image included in the first image set, determine a target expression image in response to a selection trigger operation of the target user among the first image set, and display the target expression image on the session page, wherein the extraction code comprises:

positioning sub-code configured to cause the at least one processor to perform face positioning on the image data, and extract facial features from the face positioning;

similarity determining sub-code configured to cause the at least one processor to determine similarities between the extracted facial features and a plurality of object features included in the object feature library; and image set determining sub-code configured to cause the at least one processor to determine the first image set based on the similarities between extracted facial features and the plurality of object features.

15. The apparatus according to claim 14, wherein the object feature library comprises the plurality of object features and expression images corresponding to the plurality of object features, expression images corresponding to similar object features are clustered into an associated image cluster, the similarity determining sub-code is configured to cause the at least one processor to determine an associated image cluster to which an object feature with a largest similarity belongs as a target image cluster corresponding to the extracted facial features; and the image set determining sub-code is configured to cause the at least one processor to determine at least one expression image included in the target image cluster as the first image set.

16. The apparatus according to claim 14, wherein the object feature library comprises a plurality of associated image clusters, and expression images in each of the plurality of associated image clusters have similar object features; and the program code further comprises:

jump code configured to cause the at least one processor to, based on the operation object being a classification label, jump from the session page to an expression classification page, and display, on the expression classification page, a plurality of associated image clusters in the object feature library that correspond to the classification label; and first image set determining code configured to cause the at least one processor to determine an expression image included in a selected associated image cluster as a second image set in response to a cluster selection operation of the target user among the plurality of displayed associated image clusters.

17. The apparatus according to claim 14, wherein the object feature library comprises a plurality of associated image clusters, and expression images in each of the plurality of associated image clusters have similar object features; and the program code further comprises:

first search code configured to cause the at least one processor to, based on the operation object being symbol information, search the object feature library for a plurality of associated image clusters associated with the symbol information, and display the plurality of found associated image clusters on the session page; and second image set determining code configured to cause the at least one processor to determine an expression image included in a selected associated image cluster as a third image set in response to a cluster selection operation of the target user of the plurality of displayed associated image clusters.

18. The apparatus according to claim 14, wherein the object feature library comprises a plurality of associated image clusters, expression images in each of the plurality of associated image clusters have similar object features, and each associated image cluster corresponds to the associated user of the target user in the instant messaging application; and the program code further comprises:

second search code configured to cause the at least one processor to, based on the operation object being a keyword, semantic information of the keyword, and search the object feature library for a candidate expression image matching the semantic information; and third image set determining code configured to cause the at least one processor to obtain user information on the session page, determine an associated image cluster corresponding to the user information from the object feature library, and determine a candidate expression image included in the determined associated image cluster as a fourth image set.

19. The apparatus according to claim 14, wherein the selection code comprises:

content feature extraction sub-code configured to cause the at least one processor to obtain a to-be-transformed expression image in response to the selection trigger operation, and extract a content feature corresponding to the to-be-transformed expression image; and feature fusion sub-code configured to cause the at least one processor obtain a target transform text corresponding to the to-be-transformed expression image, obtain an expression feature matching the target transform text, and generate the target expression image based on the content feature and the expression feature.

20. The apparatus according to claim 14, wherein the program code further comprises:

video data obtaining code configured to cause the at least one processor to obtain video data, and obtain an image dataset comprising an object from the video data, the image dataset comprising a plurality of pieces of image data, and each of the plurality of pieces of image data being at least one frame of an image comprising the object in the video data; and description text addition code configured to cause the at least one processor to select target image data from the image dataset, add a description text to the target image data, determine the target image data added with the description text as an expression image, and store the target image data into the object feature library.

21. A non-transitory computer-readable storage medium, storing a computer program, the computer program being executable by at least one processor to perform:

receiving an expression image trigger operation of a target user in a state in which a session page of an instant messaging application between the target user and an associated user is displayed;

obtaining, in response to the expression image trigger operation of the target user, an operation object associated with the expression image trigger operation on the session page of the instant messaging application;

based on the operation object being image data sent from the associated user and displayed on the session page and on which the expression image trigger operation having been performed, extracting a target object feature in the image data, and obtaining, from an object feature library, a first image set based on similarities between with the target object feature and expression images of the first image set; and switching from the session page to an expression image search page that displays at least one expression image included in the first image set, determining a target expression image in response to a selection trigger operation of the target user among the first image set, and displaying the target expression image on the session page, wherein the extracting the target object feature and obtaining the first image set comprises:

performing face positioning on the image data, and extracting facial features from the face positioning;

determining similarities between the extracted facial features and a plurality of object features included in the object feature library; and determining the first image set based on the similarities between extracted facial features and the plurality of object features.

* * * * *